(12) United States Patent
Kavousi Ghafi et al.

(10) Patent No.: US 12,474,444 B2
(45) Date of Patent: Nov. 18, 2025

(54) PHASE IMBALANCE DETECTION IN A FREQUENCY MODULATED CONTINUOUS WAVE RADAR SYSTEM

(71) Applicant: Infineon Technologies AG, Neubiberg (DE)

(72) Inventors: Esmaeil Kavousi Ghafi, Linz (AT); Alexander Melzer, Neutillmitsch (AT); Matthias Wagner, Engerwitzdorf (AT); Oliver Lang, Natternbach (AT)

(73) Assignee: Infineon Technologies AG, Neubiberg (DE)

( * ) Notice: Subject to any disclaimer, the term of this patent is extended or adjusted under 35 U.S.C. 154(b) by 373 days.

(21) Appl. No.: 18/048,704

(22) Filed: Oct. 21, 2022

(65) Prior Publication Data
US 2024/0134002 A1    Apr. 25, 2024
US 2024/0230836 A9    Jul. 11, 2024

(51) Int. Cl.
*G01S 7/40*      (2006.01)
*G01S 7/35*      (2006.01)
*G01S 13/58*     (2006.01)
*G01S 13/89*     (2006.01)

(52) U.S. Cl.
CPC .............. *G01S 7/40* (2013.01); *G01S 7/356* (2021.05); *G01S 13/584* (2013.01); *G01S 13/89* (2013.01)

(58) Field of Classification Search
CPC . G01S 7/40; G01S 7/483; G01S 7/497; G01S 7/35; G01S 7/356; G01S 13/584; G01S 13/58; G01S 13/89; G01S 13/06; H04B 17/15; H01L 2223/58
See application file for complete search history.

(56) References Cited

U.S. PATENT DOCUMENTS

| | | | |
|---|---|---|---|
| 5,559,518 A * | 9/1996 | DiDomizio | G01S 7/2813 342/174 |
| 10,591,591 B1 * | 3/2020 | Prestwich | G01S 13/4481 |
| 2018/0172813 A1 * | 6/2018 | Rao | G01S 13/343 |
| 2019/0353780 A1 * | 11/2019 | Statnikov | G01S 13/931 |
| 2020/0284874 A1 * | 9/2020 | Narayana Moorthy | G01S 13/343 |
| 2021/0364622 A1 * | 11/2021 | Roger | G01S 13/584 |

* cited by examiner

*Primary Examiner* — Jack W Keith
*Assistant Examiner* — Clayton Paul Ridder
(74) *Attorney, Agent, or Firm* — Harrity & Harrity, LLP

(57) ABSTRACT

A radar device may generate an integrated range-velocity map by combining data from a plurality of range-velocity maps. Each range-velocity map may be associated with a respective radar channel from a plurality of radar channels. The radar device may identify a first peak in the integrated range-velocity map. The first peak may indicate one or more radar targets in the integrated range-velocity map and being identified by a first bin having a first range-velocity bin index. The radar device may determine a first data set by extracting, from each range-velocity map, data that is included in a respective bin associated with the first range-velocity bin index. The radar device may process the first data set to determine a first set of phase imbalances associated with the plurality of radar channels.

26 Claims, 15 Drawing Sheets

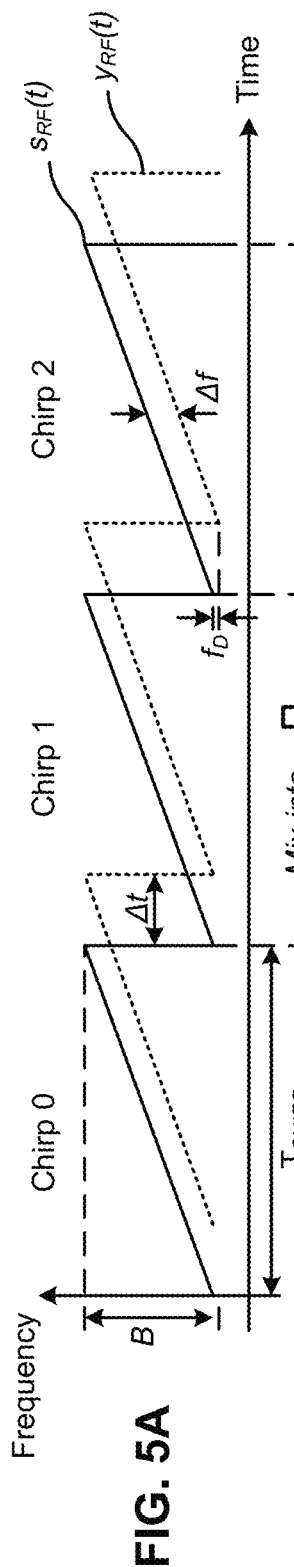
FIG. 5A
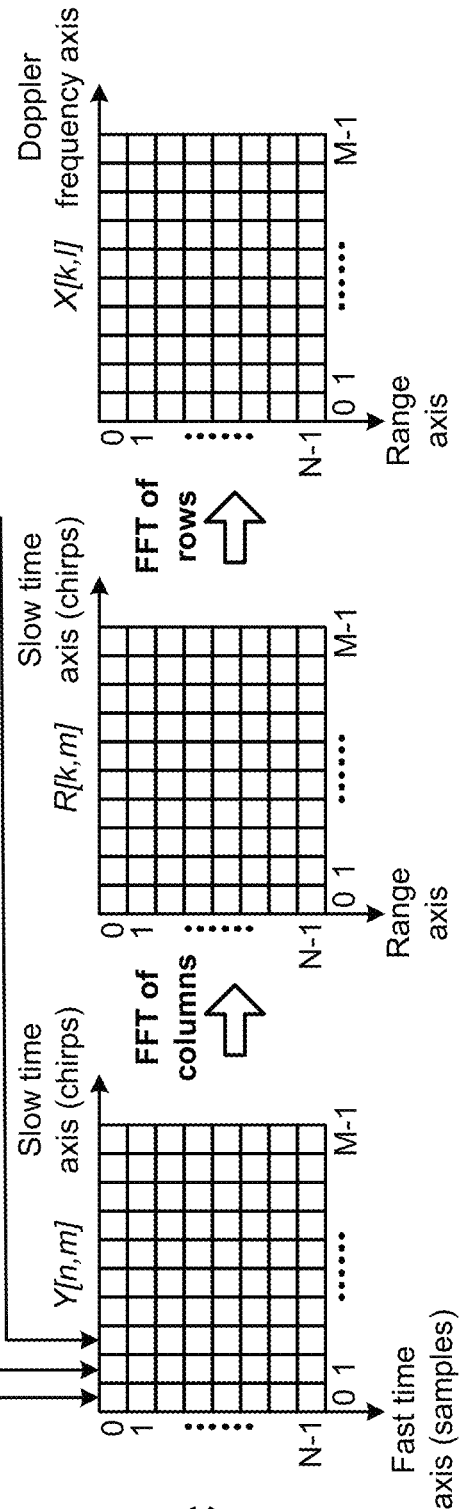
FIG. 5B
FIG. 5C

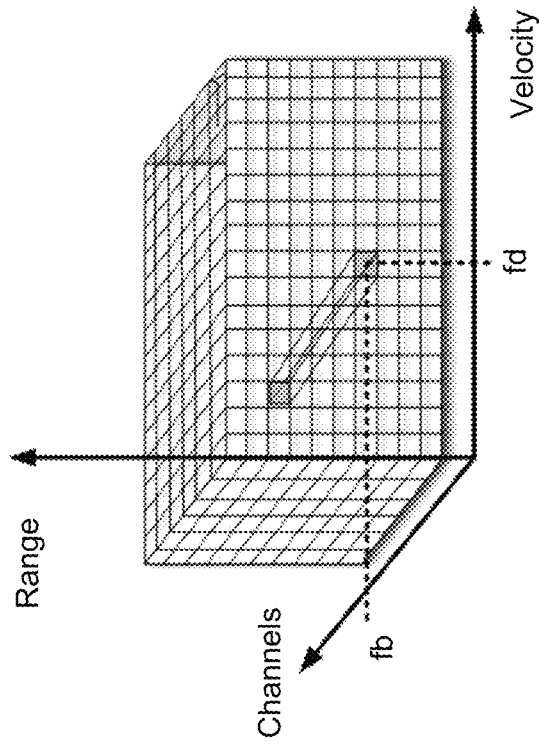

$$s(k) = e^{j\,\varphi_{imb}(k)} \sum_{i=1}^{Q} \alpha_i e^{j(f_{\theta i}k + \varphi_i + n_{\varphi i})} + n_a$$

| $k = 1:K$ | index of virtual array elements |
| --- | --- |
| $Q$ | number of targets |
| $\alpha_i$ | amplitude of each target |
| $f_{\theta i}$ | frequency corresponding to the angle of arrival of each target |
| $\varphi_i$ | constant phase of each target |
| $n_{\varphi i}, n_a$ | noise |
| $\varphi_{imb}$ | vector of phase imbalances |

FIG. 7A

PHASE IMBALANCE DETECTION IN A FREQUENCY MODULATED CONTINUOUS WAVE RADAR SYSTEM

BACKGROUND

Radar sensors are used in a number of applications to detect objects, where the detection typically comprises measuring distances, velocities, or angles of arrival of detected targets. In particular in the automotive sector, there is an increasing need for radar sensors that are able to be used in, for example, driving assistance systems (e.g., advanced driver assistance systems (ADAS)), such as for example in adaptive cruise control (ACC) or radar cruise control systems. Such systems are automatically able to adjust the speed of a motor vehicle in order to maintain a safe distance from other motor vehicles traveling in front of the motor vehicle (and from other objects and from pedestrians). Other example applications of a radar sensor in the automotive sector include blind spot detection, lane change assist, and the like.

SUMMARY

In some implementations, a radar device includes one or more memories; and one or more processors, communicatively coupled to the one or more memories, configured to: generate an integrated range-velocity map by combining data from a plurality of range-velocity maps, each range-velocity map in the plurality of range-velocity maps being associated with a respective radar channel from a plurality of radar channels; identify a first peak in the integrated range-velocity map, the first peak indicating one or more radar targets in the integrated range-velocity map and being identified by a first bin having a first range-velocity bin index; determine a first data set from the plurality of range-velocity maps, the first data set being determined by extracting, from each range-velocity map of the plurality of range-velocity maps, data that is included in a respective bin associated with the first range-velocity bin index; and process the first data set to determine a first set of phase imbalances associated with the plurality of radar channels.

In some implementations, a method includes generating, by a radar device, an integrated range-velocity map based on a plurality of range-velocity maps, each range-velocity map in the plurality of range-velocity maps being associated with a respective radar channel from a plurality of radar channels; identifying, by the radar device, a first peak in the integrated range-velocity map, the first peak indicating one or more radar targets in the integrated range-velocity map and being associated with a first bin index; determining, by the radar device, a first data set from the plurality of range-velocity maps, the first data set being determined by extracting, from each range-velocity map of the plurality of range-velocity maps, data from a respective bin associated with the first bin index; and determining, by the radar device, a first set of phase imbalances associated with the plurality of radar channels based on the first data set.

In some implementations, a radar system includes a set of receive antennas; a set of transmit antennas; and one or more components configured to: identify a first peak in an integrated range-velocity map, the first peak indicating one or more radar targets in the integrated range-velocity map and being identified by a first bin having a first bin index, wherein the integrated range-velocity map is based on a plurality of range-velocity maps, each range-velocity map in the plurality of range-velocity maps being associated with a respective radar channel from a plurality of radar channels; determine a first data set from the plurality of range-velocity maps, the first data set being determined based on the plurality of range-velocity maps and a plurality of bins associated with the first-velocity bin index; and generate a first set of phase imbalances associated with the plurality of radar channels based on the first data set, the first set of phase imbalances indicating phase imbalances for the set or receive antennas or for the set of transmit antennas.

BRIEF DESCRIPTION OF THE DRAWINGS

FIGS. 5A-5C illustrates an example of signal processing performed by the radar sensor.

FIGS. 7A and 7B are diagrams associated with a first implementation for performing phase imbalance detection in the radar sensor.

DETAILED DESCRIPTION

Figure 1:
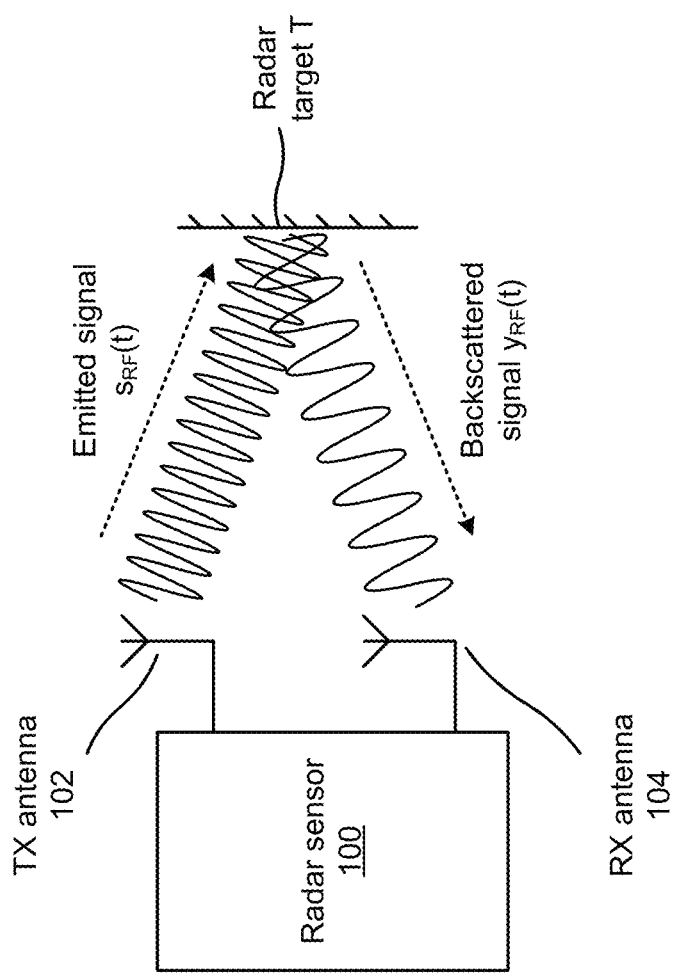
FIG. 1 is a diagram of an example application of a frequency-modulated continuous-wave (FMCW) radar sensor.

The following detailed description of example implementations refers to the accompanying drawings. The same reference numbers in different drawings may identify the same or similar elements.

In a radar sensor, a monolithic microwave integrated circuit (MMIC) comprising one or more components may be connected to a printed circuit board (PCB) by a set of solder balls. During a lifetime of the radar sensor, a solder ball may break, which causes a connection between the MMIC and the PCB to be broken or degraded. Such a break, referred to as a ball break, can cause phase deviation or attenuation of a signal transmitted by the radar sensor (e.g., when the ball break is on connection of a transmit (TX) antenna) and/or a signal received by the radar sensor (e.g., when the ball break is on connection of a receive (RX) antenna). Some processing steps, such as angle of arrival (AoA) estimation of a target of the radar sensor, rely on a phase of the received radar signal. Therefore, a phase deviation originated from a ball break associated with a TX antenna or an RX antenna can significantly reduce performance of the radar sensor. Hence, detection of a ball break is a critical safety task to ensure safe and reliable operation of the radar sensor.

One technique for performing ball break detection is a hardware-based technique according to which ball break detection is performed by measuring a direct current (DC) resistance to ground at an input pad of the radar sensor. However, while such a technique provides ball break detection, implementation of the technique in a complementary metal-oxide-semiconductor (CMOS)-based radar sensors causes significant noise figure degradation which negatively impacts accuracy and reliability of the radar sensor and, therefore, is undesirable. Another technique for performing ball break detection is a hardware-based technique according to which impedance of an antenna (and ball) is measured using a matching circuit and a test signal. Here, if the measured impedance is higher than an impedance threshold, then a ball break is detected. However, while such a technique provides ball break detection, an area on the MMIC needed to implement this technique is significant and, therefore, such a technique may be undesirable (e.g., when an available area on the MMIC is limited).

Some implementations described herein enable phase imbalance detection in a frequency-modulated continuous-wave (FMCW) radar sensor. In some aspects, a radar device (e.g., an FMCW radar sensor) may generate an integrated range-velocity map by combining data from a plurality of range-velocity maps, where each range-velocity map in the plurality of range-velocity maps is associated with a respective radar channel from a plurality of radar channels. The radar device may identify a peak in the integrated range-velocity map, with the peak indicating one or more radar targets in the integrated range-velocity map and being identified by a bin having a range-velocity bin index. The radar device may then determine a data set from the plurality of range-velocity maps, where the data set is determined by extracting, from each range-velocity map of the plurality of range-velocity maps, data that is included in a respective bin associated with the range-velocity bin index. The radar device may then process the data set to determine a set of phase imbalances associated with the plurality of radar channels.

The techniques and apparatuses described herein utilize a signal processing approach for phase imbalance detection, meaning that these techniques can be implemented on a controller of the radar device (e.g., rather than requiring additional MMIC circuitry). Another advantage is that the techniques and apparatuses described herein require low computational complexity because most of the required computation already needs to be performed for normal operation of the radar device. Another advantage is that, although ball break detection is provided by the techniques and apparatuses described herein, the techniques and apparatuses described herein can also be utilized more generally for (e.g., real-time) phase imbalance detection and calibration (e.g., to detect and/or calibrate a phase imbalance with a cause other than a ball break). Additional details are provided below.

FIG. 1 is a diagram illustrating an example application of a FMCW radar sensor in the form of a radar sensor 100 for measuring distances, velocities, or AoAs of objects, referred to as targets. As shown in FIG. 1, the radar sensor 100 may have one or more TX antennas 102 and one or more RX antennas 104. In some implementations, a single antenna may be used that serves simultaneously as a TX antenna 102 and as an RX antenna 104. In operation, the TX antenna 102 emits a radio frequency (RF) signal $s_{RF}$ (t) (herein referred to as a transmitted radar signal), which is frequency-modulated with, for example, a type of sawtooth signal (e.g., a periodic linear frequency ramp). The transmitted radar signal $s_{RF}$ (t) is backscattered at a target T and a backscattered/reflected signal $y_{RF}$ (t) (i.e., an echo signal, also referred to herein as a received radar signal) is received by the RX antenna 104. FIG. 1 shows a simplified example—in practice, the radar sensor 100 may include a plurality of TX antennas 102 and RX antennas 104 to be able to determine an AoA of the received radar signal $y_{RF}$ (t) and, therefore, locate the target T with increased accuracy.

As indicated above, FIG. 1 is provided as an example. Other examples may differ from what is described with regard to FIG. 1.

Figure 2:
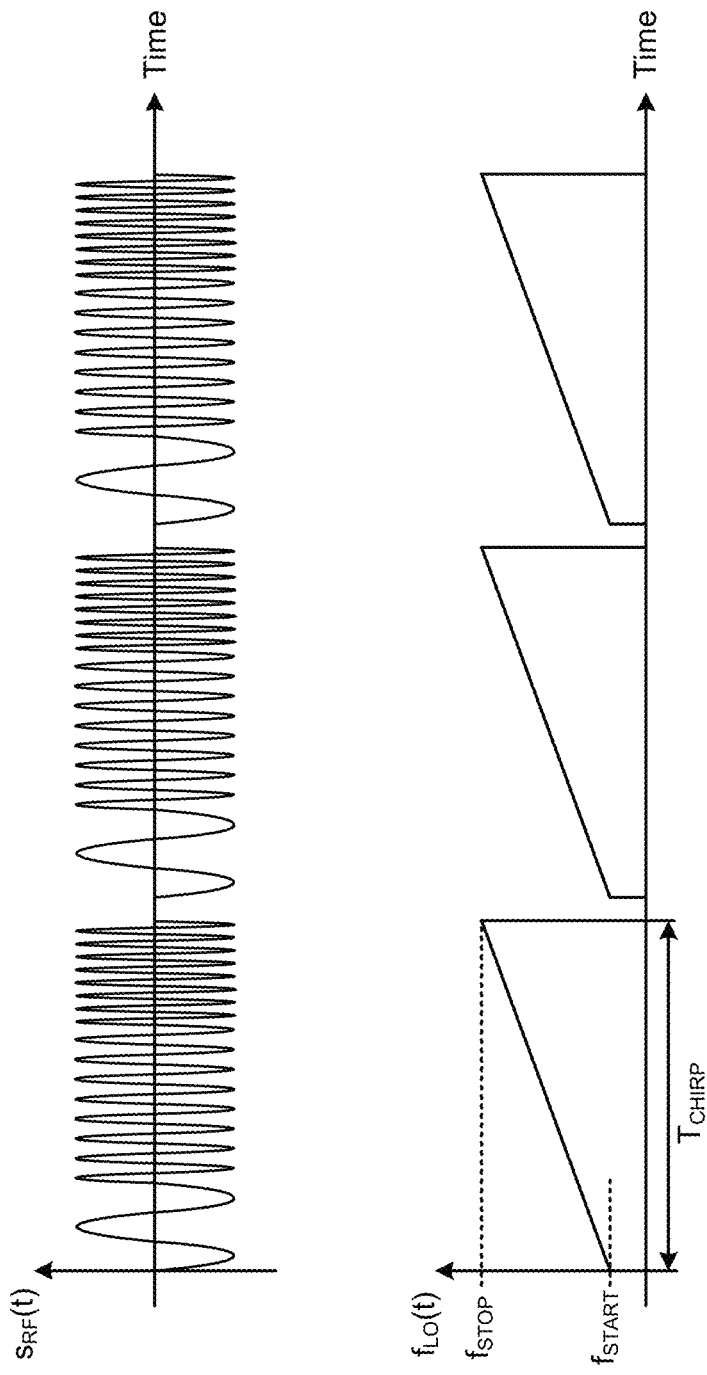
FIG. 2 illustrates an example of frequency modulation of a transmitted radar signal transmitted by the radar sensor.

FIG. 2 illustrates an example of the frequency modulation of the transmitted radar signal $s_{RF}$ (t). As illustrated in the upper diagram of FIG. 2, the transmitted radar signal $s_{RF}$ (t) comprises a series of "chirps"; that is to say the transmitted radar signal $s_{RF}$ (t) comprises a sequence of sinusoidal signal profiles (i.e., waveforms) with a rising frequency (referred to as an up-chirp) or a falling frequency (referred to as a down-chirp). In the example shown in FIG. 2, the instantaneous frequency $f_{LO}$ (t) of a chirp increases linearly, starting at a start frequency $f_{START}$, to a stop frequency $f_{STOP}$ within a time interval $T_{CHIRP}$, as shown in the lower diagram of FIG. 2. Such chirps are also referred to as linear frequency ramps. FIG. 2 illustrates three identical linear frequency ramps; however, the parameters $f_{START}$, $f_{STOP}$, or $T_{CHIRP}$ and a pause between individual frequency ramps may be varied. Further, the frequency variation need not be linear. Depending on the implementation, transmitted radar signals with exponential or hyperbolic frequency variation (e.g., exponential chirps or hyperbolic chirps) may be used, for example. For a measurement, a sequence of frequency ramps is emitted, and a resulting echo signal is evaluated in baseband to detect one or more radar targets.

As indicated above, FIG. 2 is provided as an example. Other examples may differ from what is described with regard to FIG. 2.

Figure 3:
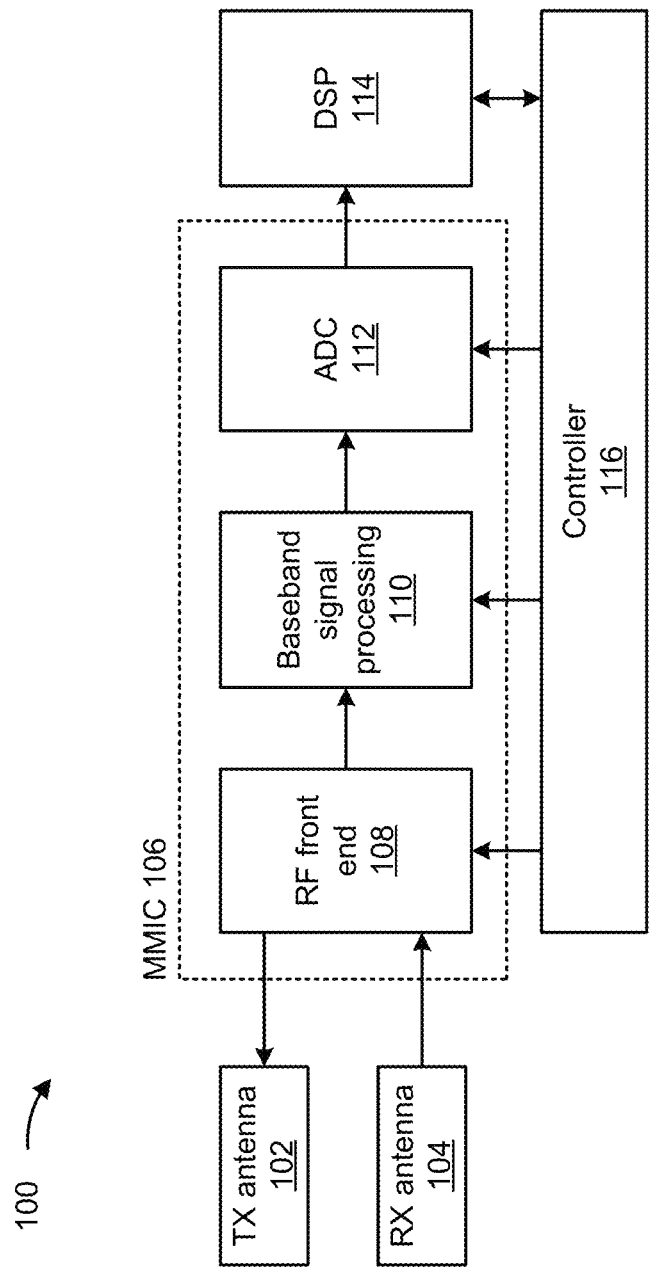
FIG. 3 is a block diagram that illustrates an example structure of the radar sensor.

FIG. 3 is a block diagram that illustrates an example structure of the radar sensor 100. As shown, the radar sensor 100 may include one or more TX antennas 102, one or more RX antennas 104, a MMIC 106 (comprising an RF front end 108, a baseband signal processing component 110, and an analog-to-digital convertor (ADC) 112), a digital signal processor (DSP) 114, and a controller 116.

In the radar sensor 100, the one or more TX antennas 102 and the one or more RX antennas 104 are connected to the RF front end 108. The RF front end 108 may include circuit components associated with performing RF signal processing. These circuit components may include, for example, a local oscillator (LO), one or more RF power amplifiers, one or more low noise amplifiers (LNA), one or more directional couplers (e.g., rat-race couplers, circulators, or the like), or one or more mixers for downmixing (or down-converting) RF signals into baseband or an intermediate frequency band (IF band). As shown, the RF front end 108 may be integrated into the MMIC 106 with one or more other components, as shown in FIG. 3. The IF band is sometimes also referred to as baseband. No further distinction is drawn herein between baseband and IF band, and only the term baseband is used herein. Baseband signals are those signals on the basis of which radar targets are detected.

The example illustrated in FIG. 3 shows a bistatic (or pseudo-monostatic) radar system with a separate RX antenna 104 and TX antenna 102. In a monostatic radar sensor 100, the same antenna could be used both to emit and to receive radar signals. In such an implementation, a directional coupler (e.g., a circulator) may be used to separate RF signals to be emitted from received radar signals.

In some implementations, the radar sensor 100 may include a plurality of TX antennas 102 and a plurality of RX antennas 104, which enables the radar sensor 100 to measure an AoA from which radar echoes are received. In the case of such multiple-input multiple-output (MIMO) systems, individual TX channels and RX channels may be constructed identically or similarly and may be distributed over one or more MMICs 106.

In some implementations, a signal emitted by the TX antenna 102 may be in a range from approximately 20 gigahertz (GHz) to approximately 100 GHz, such as in a range between of approximately 76 GHz and approximately 81 GHz. As mentioned, a radar signal received by the RX antenna 104 includes radar echoes (e.g., chirp echo signals); that is to say those signal components that are backscattered at one or more targets. The received radar signal $y_{RF}$ (t) is downmixed into, for example, baseband and processed further in baseband by way of analog signal processing performed by the baseband signal processing component 110. In some implementations, the baseband signal processing component 110 may be configured to filter and/or amplify the baseband signal. The ADC 112 may be configured to digitize the baseband signal. The DSP 114 may be configured to further process the digitized baseband signal in the digital domain. In some implementations, the controller 116 is configured to control operation of the radar sensor 100 (e.g., by controlling one or more other components of the radar sensor 100, as indicated in FIG. 3). The controller 116 may include, for example, a microcontroller (μC).

In some implementations, the RF front end 108, the baseband signal processing component 110, the ADC 112, and/or the DSP 114 may be integrated in a single MMIC 106 (e.g., an RF semiconductor chip). Alternatively, two or more of these components may be distributed over multiple MMICs 106. In some implementations, the DSP 114 may be included in the controller 116. In some implementations, the techniques associated with detection of a phase imbalance as described herein may be performed by one or more components of the radar sensor 100, such as by the DSP 114, the controller 116, or the like.

As indicated above, FIG. 3 is provided as an example. Other examples may differ from what is described with regard to FIG. 3. The number and arrangement of devices and components shown in FIG. 3 are provided as an example. In practice, there may be additional devices or components, fewer devices or components, different devices or components, or differently arranged devices or components than those shown in FIG. 3. Furthermore, two or more devices or components shown in FIG. 3 may be implemented within a single device or component, or a single device or component shown in FIG. 3 may be implemented as multiple, distributed devices or components. Additionally, or alternatively, a set of devices or components (e.g., one or more devices or components) shown in FIG. 3 may perform one or more functions described as being performed by another set of devices or components shown in FIG. 3.

Figure 4:
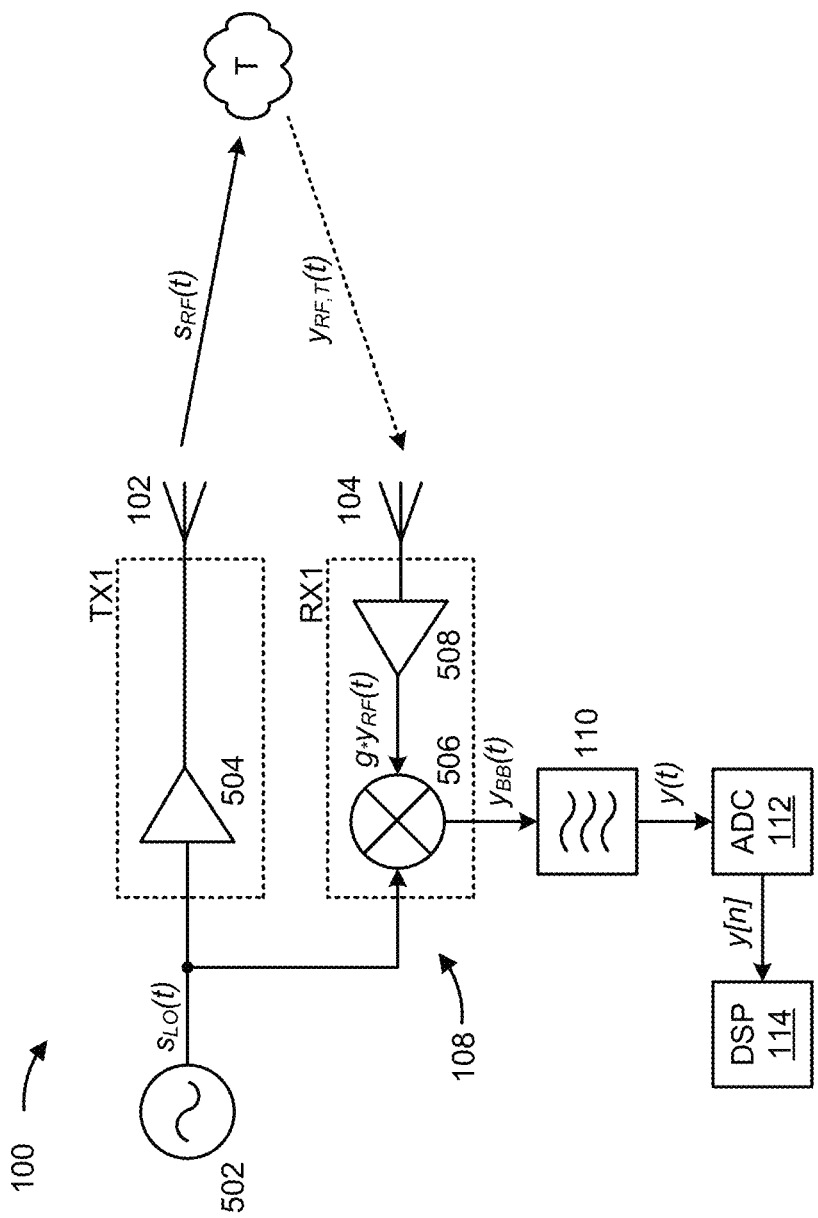
FIG. 4 illustrates an example implementation of the radar sensor according to the example from FIG. 3.

FIG. 4 illustrates an example implementation of a radar sensor 100 according to the example from FIG. 3. The example shown in FIG. 4 illustrates an example of the RF front end 108 of the radar sensor 100. FIG. 4 illustrates a simplified circuit diagram to show a fundamental structure of the RF front end 108 with one TX channel and one RX channel. As noted above, the radar sensor 100 may in practice include a plurality of TX channels and/or a plurality of RX channels.

As shown, the RF front end 108 comprises a local oscillator (LO) 502 that generates an RF oscillator signal $s_{LO}$ (t). During operation—as described above with reference to FIG. 2—the RF oscillator signal $s_{LO}$ (t) is frequency-modulated and may be referred to as an LO signal. In radar applications, the LO signal may be in a super high frequency (SHF) band (i.e., centimeter wave) or in an extremely high frequency (EHF) band (i.e., millimeter wave), for example, in a range between approximately 76 GHz and approximately 81 GHz. The LO signal $s_{Lo}$ (t) is processed both in the transmitted radar signal path TX1 (in the TX channel) and in the received radar signal path RX1 (in the RX channel).

The transmitted radar signal $s_{RF}$ (t) emitted by the TX antenna 102 is generated by amplifying the LO signal $s_{LO}$ (t), for example by an RF power amplifier 504 and, therefore, is an amplified and (possibly) phase-shifted version of the LO signal $s_{LO}$ (t). The output of the amplifier 504 may be coupled to the TX antenna 102 (e.g., in a bistatic or pseudo-monostatic radar configuration). As shown, the transmitted radar signal is backscattered/reflected by a target T, and a resulting RF signal $y_{RF}$(t) is received at the RX antenna 104.

The received radar signal $y_{RF}$(t) received by the RX antenna 104 is provided to a receiver circuit in the RX channel and, therefore, directly or indirectly to an RF port of the mixer 506. In the example shown in FIG. 4, the received radar signal $y_{RF}$(t) is pre-amplified by an amplifier 508 (e.g., using an amplification factor g). The mixer 506 therefore in some implementations receives an amplified received radar signal $g \cdot y_{RF}$(t). The amplifier 508 may be, for example, an LNA. As further shown, the LO signal $s_{LO}$(t) is provided to a reference port of the mixer 506, and the mixer 506 downmixes the (pre-amplified) received radar signal $y_{RF}$(t) into baseband. The downmixed baseband signal (i.e., a mixer output signal) is referred to as baseband signal $y_{BB}$(t). This baseband signal $y_{BB}$ (t) is processed in the analog domain by the baseband signal processing component 110, which may perform, for example, amplification and filtering (e.g., band-pass filtering, low-pass filtering, or the like) to suppress undesired sidebands or mirror frequencies. A resulting analog output signal provided to ADC 112 is referred to as analog signal y(t). The ADC 112 digitizes the analog signal y(t) to generate a digitize signal y[n]. The DSP 114 may then further process the digitized signal y[n]. For example, the DSP 114 may perform a range-velocity analysis or phase imbalance detection, as described in further detail below.

In some implementations, the mixer 506 downmixes the pre-amplified received radar signal $g \cdot y_{RF}$(t) into baseband. In some implementations, the mixing may be performed in one stage (i.e., from the RF band directly into baseband) or over one or more intermediate stages (i.e., from the RF band into an intermediate frequency band and further into baseband). In the latter case, the mixer 506 may comprise a plurality of individual mixer stages connected in series. In some implementations, an in-phase and quadrature (IQ) mixer may be used to generate complex baseband signals (e.g., including in-phase and quadrature components). Further, with respect to the example shown in FIG. 4, a quality of a radar measurement depends on a quality of the LO signal $s_{LO}$ (t), for example on an amount of noise included in the LO signal $s_{LO}$ (t), which is determined in terms of quantity by the phase noise of the LO 502.

As indicated above, FIG. 4 is provided as an example. Other examples may differ from what is described with regard to FIG. 4. The number and arrangement of devices and components shown in FIG. 4 are provided as an example. In practice, there may be additional devices or components, fewer devices or components, different devices or components, or differently arranged devices or components than those shown in FIG. 4. Furthermore, two or more devices or components shown in FIG. 4 may be implemented within a single device or component, or a single device or component shown in FIG. 4 may be implemented as multiple, distributed devices or components. Additionally, or alternatively, a set of devices or components (e.g., one or more devices or components) shown in FIG. 4 may perform one or more functions described as being performed by another set of devices or components shown in FIG. 4.

FIGS. 5A-5C illustrates an example of signal processing performed by the radar sensor 100. FIG. 5A illustrates a portion of a chirp sequence that comprises M linear chirps. The solid line represents a signal profile (e.g., waveform, frequency over time) of a transmitted radar signal $s_{RF}(t)$, and the dashed line represents a corresponding signal profile of a received (and possibly pre-amplified) signal $y_{RF}(t)$ that (when present) includes chirp echoes. In the example shown by FIG. 5A, a frequency of the transmitted radar signal $s_{RF}(t)$ increases linearly, starting at a start frequency $f_{START}$, to a stop frequency $f_{STOP}$ (e.g., for chirp 0), and then returns to the start frequency $f_{START}$, increases to the stop frequency $f_{STOP}$ (e.g., for chirp 1), and so on.

Depending on the application, a chirp sequence may include one or more chirps with different parameters (e.g., a different start frequency, a different stop frequency, or the like). For example, during a modulation pause between two successive chirps, the frequency may be the same as the stop frequency of the previous chirp or the start frequency of the following chirp. The chirp duration may be in the range from, for example, a few microseconds (µs) to a few milliseconds (ms), for example in a range from approximately 20 µs to approximately 2 ms. The number M of chirps in a chirp sequence may correspond to a power of two, for example the chirp sequence may include 256 chirps (M=256).

As shown in FIG. 5A, the received radar signal $y_{RF}(t)$ (e.g., received by an RX antenna 104) lags the transmitted radar signal $s_{RF}(t)$ (e.g., emitted by one or more TX antennas 102) by a time difference Δt. The time difference Δt corresponds to a signal propagation time from the one or more TX antennas 102 to a target and back to the RX antennas 104. The signal propagation time may also be referred to as a round trip delay time (RTDT). A distance $d_{T_i}$ of a target $T_i$ from the radar sensor 100 is equal to the speed of light c times half the time difference Δt (i.e., $d_{T_i}=c\cdot\Delta t/2$). As can be seen in FIG. 5A, the time difference Δt results in a corresponding frequency difference Δf at a given point in time. This frequency difference Δf may be determined by mixing the received radar signal $y_{RF}(t)$ with the LO signal $s_{LO}(t)$ of the radar sensor 100, digitizing a resulting baseband signal y(t), and then performing digital spectral analysis. The frequency difference Δf appears in the spectrum of the digitized baseband signal y[n] as a beat frequency. If linear chirps are used, then the time difference Δt may be calculated according to Δt=Δf/k, where the factor k is a gradient (hertz per second) of the frequency ramp that can be calculated according to k=B/$T_{CHIRP}$, where B is a bandwidth of a chirp (B=|$f_{STOP}$-$f_{START}$|). The distance $d_{T_i}$ of the target $T_i$ can therefore be determined using the following equation:

$$d_{T_i}=c\cdot\Delta t/2=c\cdot\Delta f\cdot T_{CHIRP}/ \quad (2B)$$

In some implementations, additional signal processing can be performed in addition to the basic functional principle of the radar sensor 100 described above. For example, an additional Doppler shift $f_D$ of the received radar signal (e.g., a frequency shift caused by the Doppler effect) may influence the distance measurement by adding the Doppler shift $f_D$ to the frequency difference Δf. In some applications, the Doppler shift may be estimated from the transmitted radar signal $s_{RF}(t)$ and the received radar signal $y_{RF}(t)$ and may be considered in the distance measurement, whereas the Doppler shift may be negligible for the distance measurement in some other applications. The Doppler shift may have a negligible effect when, for example, a chirp duration is relatively high and a velocity of the target is relatively low (e.g., such that the frequency difference Δf is large in comparison with the Doppler shift $f_D$). In some implementations, the Doppler shift may be eliminated by determining the distance based on an up-chirp and a down-chirp in the distance measurement. Here, the distance $d_T$ may be calculated as the average of distance values obtained from a measurement using up-chirps and a measurement using down-chirps. Thus, the Doppler shift may in some implementations be eliminated through averaging.

One example of a signal processing technique for processing FMCW signals involves calculating so-called range-velocity maps (also referred to as range-Doppler maps or range-Doppler images). In general, as described above, the radar sensor 100 may determine information associated with a target (e.g., a distance, a velocity, or an AoA) by transmitting a radar signal $s_{RF}(t)$ including a sequence of chirps and mixing the (delayed) echoes in a received radar signal $y_{RF}(t)$ (after reflection from one or more targets) with a "copy" of the LO signal $s_{Lo}(t)$. A baseband signal y(t) resulting from such mixing (e.g., after processing by the baseband signal processing component 110) is illustrated in FIG. 5B. The baseband signal y(t), and therefore the digitized baseband signal y[n] (i.e., a digital radar signal), may be divided into a plurality of segments, where each segment of the digital radar signal y [n] is associated with a particular chirp of the chirp sequence.

Information associated with a given target can then be extracted from a spectrum of segments of the digital radar signal y[n]. A range-velocity map associated with each chirp can be obtained, for example, by performing a two-stage Fourier transformation, as described below. In general, range-velocity maps may be used as a basis for detecting, identifying, and classifying one or more targets. Calculations to generate range-velocity maps can be performed by, for example, the DSP 114, the controller 116, or another hardware or software component of the radar sensor 100.

According to one example, generation of range-velocity maps involves two stages, where a plurality of Fourier transformations are calculated in each stage (e.g., using a fast Fourier transform (FFT) algorithm). For example, the baseband signal y (t) may be sampled such that N×M sampled values (samples); that is to say M segments each containing N samples, are obtained for a chirp sequence containing M chirps. Here, a sampling time interval $T_{SAMPLE}$ is selected such that each of the M segments (i.e., each chirp echo in baseband) is represented by a sequence of N samples. As illustrated in FIG. 5C, the M segments within each set of N samples may be arranged in a two-dimensional array Y [n, m]. Each column of the array Y [n, m] represents one of the M segments under consideration of the baseband signal y (t), and the $n^{th}$ row of the array Y [n, m] contains the $n^{th}$ sample of the M chirps. The row index n (n=0, 1, . . . N−1) may be considered to be a discrete time n·$T_{SAMPLE}$ (within a chirp) on a "fast" time axis. Similarly, the column index m (m=0, 1, . . . M−1) may be considered to be a discrete time m·$T_{CHIRP}$ on a "slow" time axis. The column index m corresponds to the number of the chirp in the chirp sequence.

In a first stage, a first FFT (sometimes referred to as range FFT) is applied to each chirp. The Fourier transformation is calculated for each column of the array Y [n, m]. In other words, the array Y [n, m] is Fourier-transformed along the fast time axis, and a two-dimensional array Y [n, m] of spectra, referred to as range map, is obtained as a result. Here, each of the M columns of the range map includes N (complex-value) spectral values. By virtue of the Fourier transformation, the "fast" time axis becomes the frequency axis; the row index k of the range map R [k, m] corresponds to a discrete frequency and can be referred to as a frequency bin. Each discrete frequency corresponds to a distance according to the above equation, for which reason the frequency axis can also referred to as the distance axis (or the range axis).

An example of a range map R [k, m] is illustrated in FIG. 5C. A radar echo caused by a target results in a local maximum (herein referred to as a peak) at a particular frequency bin/frequency index in the range map R [k, m]. A peak typically appears in all columns of the range map R [k, m]; that is to say the peak typically appears in the spectra of all segments under consideration of the baseband signal y[n] that are associated with the chirps of a chirp sequence. As mentioned above, the associated frequency index k may be converted into a distance value.

In a second stage, a second FFT (sometimes referred to as Doppler FFT) is applied to each of the N rows of the range map R [k, m] (k=0, . . . , N−1). Each row of the range map R [k, m] includes M spectral values of a particular frequency bin, where each frequency bin corresponds to a particular distance $d_{T_i}$ of a particular radar target $T_i$. The Fourier transformation of the spectral values in a particular frequency bin (able to be associated with a radar target) enables determination of the associated Doppler shift $f_D$ that corresponds to a velocity of the target. In other words, the two-dimensional array R [k, m] is Fourier-transformed in rows, that is to say along the "slow" time axis. The resulting Fourier transforms form an array containing N×M spectral values, which is referred to as a range-velocity map X[k, l] (k=0, . . . , N−1 and l=0, . . . , M−1). The "slow" time axis becomes the Doppler frequency axis through the second FFT. The associated discrete Doppler frequency values each correspond to a particular velocity. The Doppler frequency axis may accordingly be converted into a velocity axis. Each peak in the range-velocity map X[k, l] indicates a potential radar target. The row index k (on the range axis) associated with the peak represents the distance of the target, and the column index l (on the velocity axis) associated with the peak represents the velocity of the target. In some implementations, range-velocity maps generated by the radar sensor 100 can be used for phase imbalance detection, as described herein.

As indicated above, FIGS. 5A-5C are provided as examples. Other examples may differ from what is described with regard to FIGS. 5A-5C.

Figure 6A:
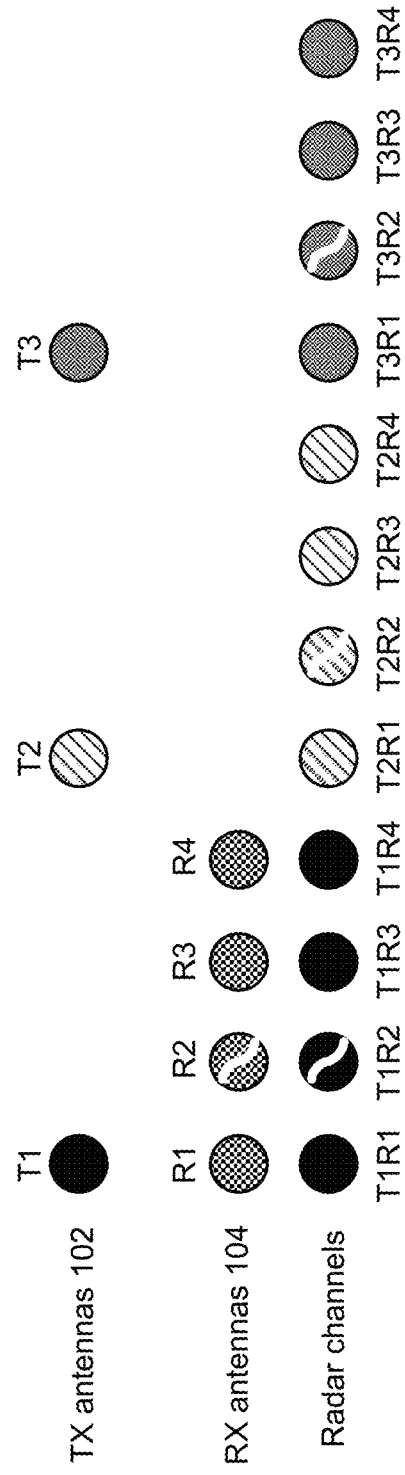
FIGS. 6A-6C are diagrams illustrating examples associated with performing phase imbalance detection in the radar sensor.

In some implementations, the radar sensor 100 may be configured to detect a phase imbalance of one or more radar channels of the radar sensor 100. As used herein, the term radar channel refers to a channel corresponding to a particular combination of TX antenna 102 and RX antenna 104 via which a radar signal is transmitted and received, respectively, by the radar sensor 100. For example, with reference to FIG. 6A, the radar sensor 100 may include three TX antennas 102 T1 through T3 and four RX antennas 104 R1 through R4. Here, as indicated in FIG. 6A, the radar sensor 100 includes 12 radar channels, and each radar channel is associated with a different TX antenna 102/RX antenna 104 combination. As indicated in FIG. 6A, a ball break on a given antenna (e.g., a ball break is indicated for RX antenna 104 R2 in FIG. 6), impacts each radar channel associated with the given antenna. For example, with reference to FIG. 6A, radar channels T1R2, T2R2, and T3R2 are impacted by a ball break on the RX antenna 104 R2.

Figure 6B:
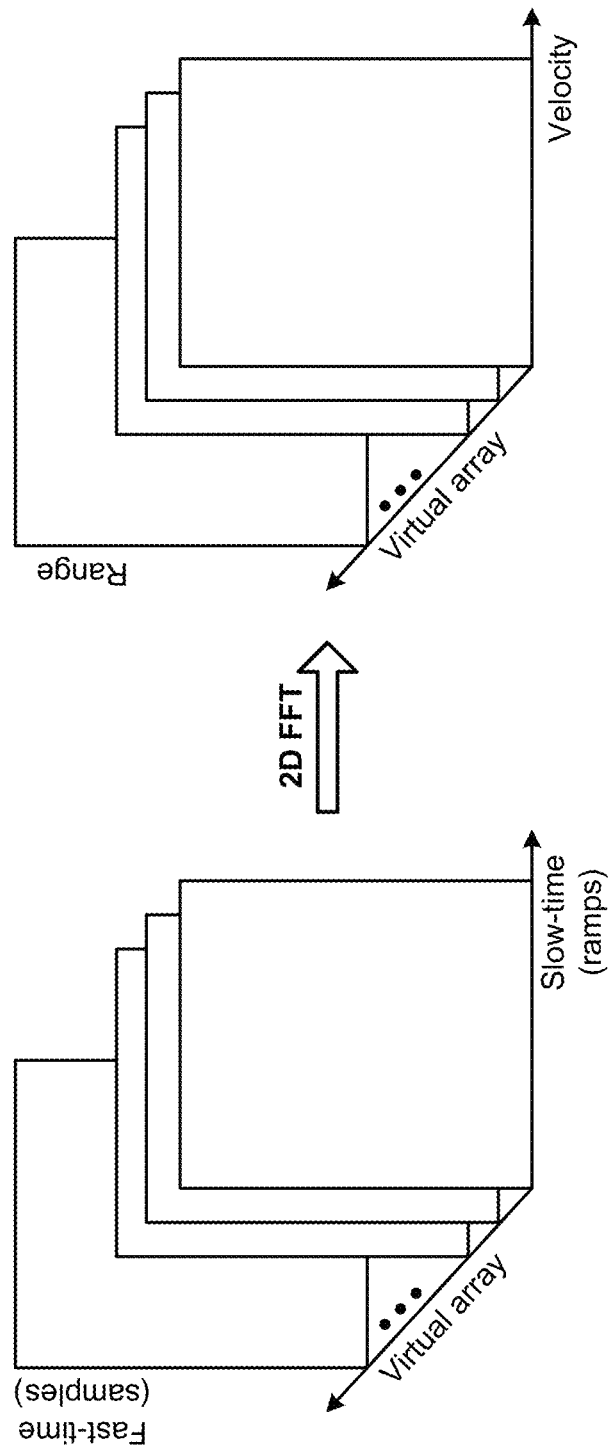

In some implementations, the radar sensor 100 obtains plurality of range-velocity maps, where each range-velocity map is associated with a respective radar channel from a plurality of radar channels of the radar sensor 100. For example, with reference to FIG. 6B, the radar sensor 100 in some implementations collects data for each radar channel of the plurality of radar channels (e.g., in the manner described above) to form a radar cube defined by the slow-time axis, the fast-time axis, and a virtual array. In FIG. 6B, each element in the virtual array corresponds to a radar channel. For example, with reference to FIG. 6A, a first virtual array element comprises a range-velocity map corresponding to a radar channel T1 R1 associated with the TX antenna 102 T1 and the RX antenna 104 R1, a second virtual array element comprises a range-velocity map corresponding to a radar channel T1R2 associated with the TX antenna 102 T1 and the RX antenna 104 R2, and so on. In some implementations, as indicated in FIG. 6B, the radar sensor 100 may perform a two-dimensional FFT on the collected radar data associated with each virtual array element (e.g., as described above with respect to FIGS. 5A-5D) to generate the plurality of range-velocity maps. In this way, the radar sensor 100 may obtain a range-velocity map for each virtual array element (i.e., for each radar channel).

Figure 6C:
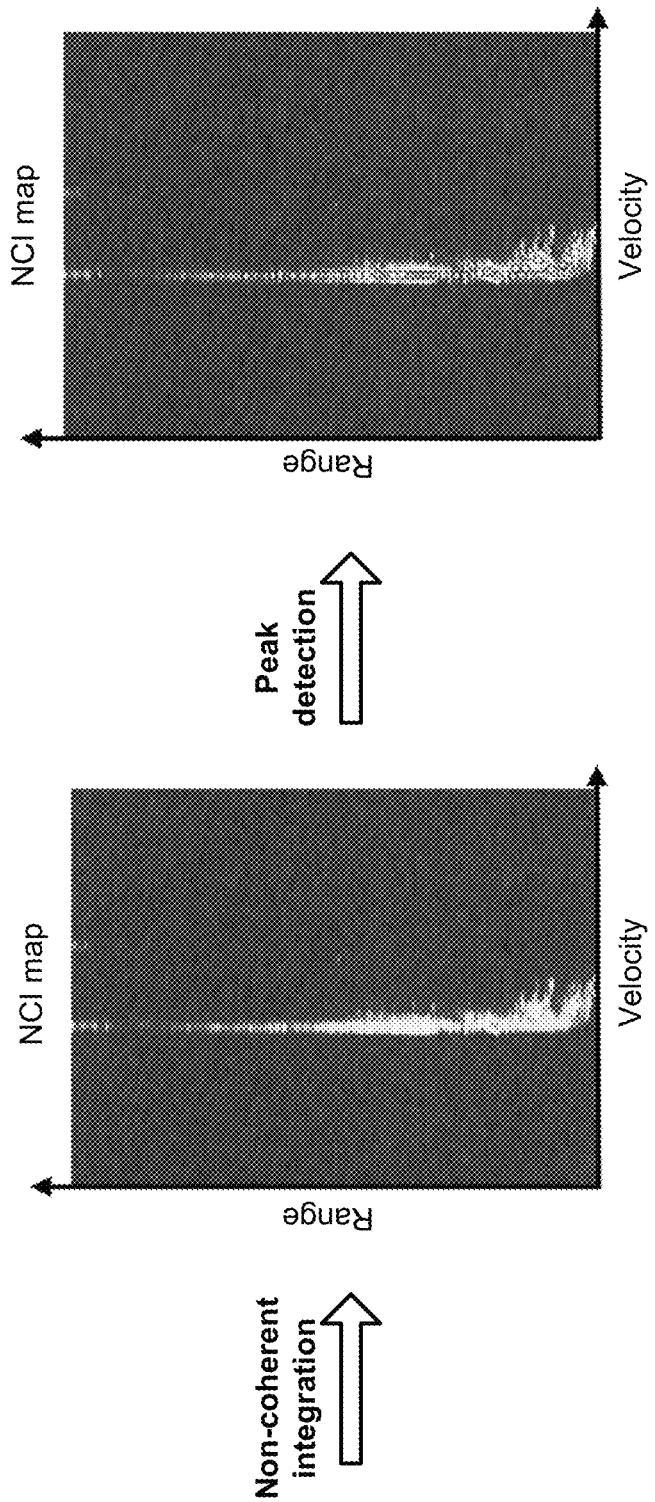

In some implementations, as illustrated in FIG. 6C, the radar sensor 100 may generate an integrated range-velocity map based on the plurality of range-velocity maps. For example, the radar sensor 100 may combine data from the plurality of range-velocity maps to generate the integrated range-velocity map. In some implementations, the radar sensor 100 may perform a non-coherent integration of the plurality of range-velocity maps to generate the integrated range-velocity map (e.g., a non-coherent integration (NCI) map).

As indicated above, FIGS. 6A-6C are provided as examples. Other examples may differ from what is described with regard to FIGS. 6A-6C.

Peaks (i.e., local maximums) of the integrated range-velocity map represent one or more targets on a corresponding range-velocity bin. In some implementations, the radar sensor 100 may identify a peak in the integrated range-velocity map by determining whether a value in a given range-velocity bin of the integrated range-velocity map satisfies (e.g., is greater than or equal to) a peak detection threshold. In some implementations, each peak is associated with a range-velocity bin index that corresponds to a range-velocity bin in which the peak is detected.

In some implementations, after identifying a peak in the integrated range-velocity map, the radar sensor 100 may determine a data set from the plurality of range-velocity maps associated with the peak. For example, the radar sensor 100 may extract, from each range-velocity map of the plurality of range-velocity maps, data that is included in a respective range-velocity bin associated with the range-velocity bin index in which the peak was identified. Here, the data set includes data from the identified range-velocity bin index for each virtual array element. The data set includes data indicating the AoA (i.e., angle) of one or more targets, amplitude imbalances of the radar channels, and phase imbalances of the radar channels. In some implementations, an impact of a ball break on amplitude is negligible and, therefore, only phase imbalances may be determined. In some implementations, the radar sensor 100 may process the data set associated with the peak to determine a set of phase imbalances associated with the plurality of radar channels.

Figure 7B:
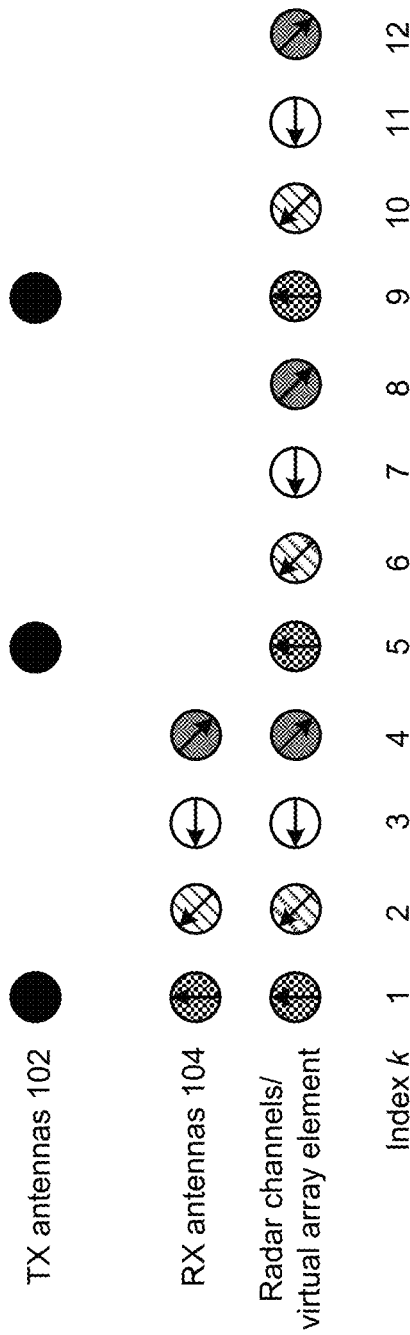

FIGS. 7A and 7B are diagrams associated with a first implementation for performing phase imbalance detection in the radar sensor 100. In some implementations, when processing the data set to determine the set of phase imbalances, the radar sensor 100 may calculate a plurality of phase values associated with a target of the one or more targets based on the data set. Here, each phase value is associated with a respective radar channel from the plurality of radar channels. Next, the radar sensor 100 may subtract a reference phase from each phase value to remove a contribution of the target from the plurality of phase values. The radar sensor 100 may then determine the set of phase imbalances based on a result of subtracting the reference phase from each phase value. Additional details regarding the first implementation are below.

In a particular, with respect to the first implementation for phase imbalance detection and as illustrated in FIG. 7A, the data set obtained from the plurality of range-velocity maps can be modeled as follows:

$$s(k)=e^{j\varphi_{imb}(k)}\Sigma_{i=1}^{Q}\alpha_i e^{j(f\theta ik+\varphi_i+n_{\varphi i})}+n_\alpha \quad (1)$$

where k=1: K is an index of a virtual array element, Q is a number of targets in the corresponding range-velocity bin, $\alpha_i$ is an amplitude of each target, $f_{\theta i}$ is a frequency corresponding to the AoA of each target, and $\varphi_i$ is a phase value associated with each target (also referred to as a constant phase). Here, $n_{\varphi i}$ and $n_\alpha$ represent noise on the phase values of targets and the data set, respectively, and $\varphi_{imb}$ is a vector of phase imbalances. The vector $\varphi_{imb}$ is similar for all targets and depends on the index of the virtual array k. In some implementations, the radar sensor 100 may estimate the vector $\varphi_{imb}$ and determine whether phase imbalances (e.g., from a ball break) exist with respect to the vector $\varphi_{imb}$, as described in further detail below. Notably, the first implementation for performing phase imbalance detection can be used for a data set associated with multiple targets (e.g., rather than only a single target)

In the case of zero phase imbalances (i.e., $\varphi_{imb}=0$), the data set s(k) can be simplified as follows:

$$s(k)=\Sigma_{i=1}^{Q}\alpha_i e^{j(f\theta ik+\varphi_i+n_{\varphi i})}+n_\alpha \quad (2)$$

Here, a phase of a target (i.e., a phase $\varphi_i$) can be estimated, for example, by (i) calculating an FFT of s(k) and detecting peaks on resulting frequency spectrum, (ii) calculating a frequency and an amplitude of the target from the detected peaks, and (iii) using the frequency and the amplitude for estimating phases as follows:

$$Ae_\varphi=s \quad (3a)$$

$$e_\varphi=(A^H A)^{-1}A^H s \quad (3b)$$

$$\varphi=\text{phase}(e_\varphi) \quad (3c)$$

where A is a K×Q matrix containing known values $A_{ik}=a_i e^{jf\theta ik}$, $e_\varphi$ is a vector including unknown phases in the form of $e_{\varphi i}=e^{j\varphi i}$ and s is the data set. Equation (3a) provides a signal model with known values, parameters to be estimated, and a measured signal. Equation (3b) solves the problem with a least-squares method, and equation (3c) extracts the estimation of phases from the complex vector $e_\varphi$.

Phase estimation using the technique described with respect to equations (3a)-(3c) is based on the fact that a phase of each target is constant over all radar channels (i.e., over all virtual array elements). It follows that this technique for phase estimation can be readily used when the phase imbalances are zero. This technique can be modified in such a way to perform phase estimation while considering phase imbalances (e.g., from a ball break) which depend on a virtual array element index k.

For example, with reference to FIG. 7B, the radar sensor 100 may include three TX antennas 102 and four RX antennas 104, meaning that a virtual array includes 12 elements (i.e., K=3×4=12). In this example, phase calibration for the TX antennas 102 is assumed such that phase imbalances are calibrated from the TX side. However, as indicated by the black arrows in FIG. 7B, the RX antennas 104 may undergo particular and different phase shifts (i.e., $\varphi_{imb}\neq 0$). As can be seen in FIG. 7B, the phase shifts are observable on the virtual array in a periodic manner. That is, elements of the virtual array that correspond to the same RX antenna 104 experience the same phase shift. For example, virtual array elements 1, 5, and 9 experience the same phase shift. This property of the virtual array can be utilized to estimate the phase imbalances. In this example, equation (1) can be rewritten as:

$$s(k)=\Sigma_{i=1}^{Q}\alpha_i e^{j(f\theta ik+\varepsilon_i(k))}+n_\alpha \quad (4)$$

where $\varepsilon_i(k)=\varphi_i+\varphi_{imb}(k)+n_{\varphi i}$. As previously noted, $\varphi_{imb}(k)$ is similar for indices of k corresponding to the same RX antenna 104. Hence, the phase of targets on these elements are constant. Therefore, for the example illustrated in FIG. 7B, the indices of k can be categorized as follows:

$$\xi_i(k)|_{k=1,5,9}=\varphi_i+\varphi_{imb}(k)|_{k=1,5,9}+n_{\varphi i}=\xi_i \quad (1)$$

$$\xi_i(k)|_{k=2,6,10}=\varphi_i+\varphi_{imb}(k)|_{k=2,6,10}+n_{\varphi i}=\xi_i \quad (2)$$

$$\xi_i(k)|_{k=3,7,11}=\varphi_i+\varphi_{imb}(k)|_{k=3,7,11}+n_{\varphi i}=\xi_i \quad (3)$$

$$\xi_i(k)|_{k=4,8,12}=\varphi_i+\varphi_{imb}(k)|_{k=4,8,12}+n_{\varphi i}=\xi_i \quad (4)$$

Here, each category is associated with three virtual array elements. Next, for each category, constant phases of the different targets can be calculated via equation set (3). For example, for a category associated with virtual array elements 1, 5 and 9 (i.e., k=1, 5, and 9), equations (3a)-(3c) can be written as follows:

$$Ae_{\xi_i(1)}=s$$

$$e_{\xi_i(1)}=(A^H A)^{-1}A^H s$$

$$\xi_i=\text{phase}(e_{\xi_i(1)}) \quad (7)$$

where A is a T×Q matrix in which T is a number of TX antennas 102. One practical condition on the system of equations is that the number of equations T should be greater or equal to the number of unknowns Q. This means, for example, if three TX antennas 102 are used in the radar sensor 100, then range-velocity bins including only up to three targets should be used for phase imbalance estimation. However, this issue is not of significant concern, as the observation probability of more than three targets in a range-velocity bin is low.

Following the same procedure for all categories of indices results in phase values (i.e., constant phases) of different targets over each channel. This can be shown in a matrix form as follows:

$$\begin{bmatrix} \xi_1(1) & \cdots & \xi_Q(1) \\ \vdots & \ddots & \vdots \\ \xi_1(M) & \cdots & \xi_Q(M) \end{bmatrix} = \begin{bmatrix} \varphi_1+\varphi_{imb}(1) & \cdots & \varphi_Q+\varphi_{imb}(1) \\ \vdots & \ddots & \vdots \\ \varphi_1+\varphi_{imb}(M) & \cdots & \varphi_Q+\varphi_{imb}(M) \end{bmatrix} + n \quad (8)$$

where n is the noise on the estimation. In equation (8), each column represents phase shifts of radar channels summed up with constant phase of targets. In this way, the radar sensor 100 may calculate a plurality of phase values associated with a target of the one or more targets based on the data set.

To remove a contribution of targets on the calculated phase values, the radar sensor 100 may subtract a phase of a reference radar channel from the phase values of other radar channels. That is, in some implementations, the radar sensor 100 may subtract a reference phase from each phase value in the plurality of phase values to remove a contribution of the target from the plurality of phase values. In some implementations, the reference radar channel may be a first radar channel. This results in phase imbalances of radar channels with a phase of the first radar channel being used as a reference phase. A resulting phase imbalance matrix corresponding to the matrix in equation (8) is as follows:

$$\begin{bmatrix} 0 & \cdots & 0 \\ \varphi_{imb}(2) - \varphi_{imb}(1) & \cdots & \varphi_{imb}(2) - \varphi_{imb}(1) \\ \vdots & \ddots & \vdots \\ \varphi_{imb}(M) - \varphi_{imb}(1) & \cdots & \varphi_{imb}(M) - \varphi_{imb}(1) \end{bmatrix} + n_r \quad (9)$$

where $n_r$ is a noise matrix on the phase imbalance estimation. As can be seen from equation (9), columns in the matrix are the same, meaning that phase imbalance estimation is target-independent. In some implementations, the radar sensor 100 may therefore average phase imbalance estimations of different targets to reduce an effect of noise.

The example of the first implementation for phase imbalance detection described above considers one or more targets on one range-velocity bin in a single radar frame. In some implementations, to reduce an effect of noise and/or to reduce errors on frequency and amplitude estimation, the radar sensor 100 may perform the operations described above for one or more additional range-velocity bins and/or for one or more additional radar frames, and then perform averaging over the multiple determined phase imbalance values.

In some implementations, after calculation of phase imbalances (e.g., that can originate from a ball break), the radar sensor 100 may compare the phase imbalances to a threshold (e.g., an expected value of a ball break induced phase imbalance). For ball break detection, the threshold may be, for example, 30 degrees (°). Here, if the radar sensor 100 determines that an estimated phase imbalance associated with a given radar channel satisfies the threshold, then the radar sensor 100 may determine that the radar channel has experienced an antenna feed issue (e.g., a ball break).

In some implementations, the radar sensor 100 may be configured to use an FFT algorithm for frequency and amplitude estimation. In some implementations, to improve accuracy of such estimations, the radar sensor 100 may be configured to use another type of technique or algorithm, such as a multiple signal classification (MUSIC) algorithm. Further, while the example described above with respect to the first implementation for phase imbalance detection is for detection of phase imbalances associated with RX antennas 104, similar operations can be applied to determination of phase imbalances associated with TX antennas 102. In such a scenario, RX channels should be calibrated in phase.

As indicated above, FIGS. 7A and 7B are provided as examples. Other examples may differ from what is described with regard to FIGS. 7A and 7B.

FIGS. 8A-8D are diagrams associated with a second implementation for performing phase imbalance detection in the radar sensor 100. In some implementations, when processing the data set to determine the set of phase imbalances, the radar sensor 100 may determine that the data set is associated with a single target. Next, the radar sensor 100 may calculate, based on the data set, a plurality of phase values associated with the single target, where each phase value in the plurality of phase values corresponds to a respective radar channel of the plurality of radar channels. The radar sensor 100 may then determine the set of phase imbalances based on the plurality of phase values. Additional details regarding the second implementation are below.

In some implementations, the second implementation uses a data set associated with a single target (e.g., a data set for which there is only one target in any range-velocity bin). When considering single targets, an amplitude of the data set is constant, and a phase of the data set is a linear function with respect to a virtual array index associated with elements of the virtual array. However, phase imbalances result in a non-linear phase of the data set. Therefore, linearity of a phase of the data set can be analyzed in order to detect a phase imbalance.

Therefore, in some implementations, after identifying a peak and extracting a data set associated with a particular range-velocity bin as described above, the radar sensor 100 may determine whether the data set is associated with a single target. For example, the radar sensor 100 may calculate an FFT of the data set over the virtual array and identify any peaks on a resulting frequency spectrum. Here, if the radar sensor 100 detects a single peak in the frequency spectrum (e.g., a single local maximum that satisfies a target detection threshold), then the radar sensor 100 may determine that the data set is associated with a single target. Conversely, if the radar sensor 100 detects multiple peaks in the frequency spectrum (e.g., multiple local maximums that satisfy the target detection threshold), then the radar sensor 100 may determine that the data set is associated with multiple targets. In the case of multiple targets, the radar sensor 100 may discard the data set.

Figure 8A:
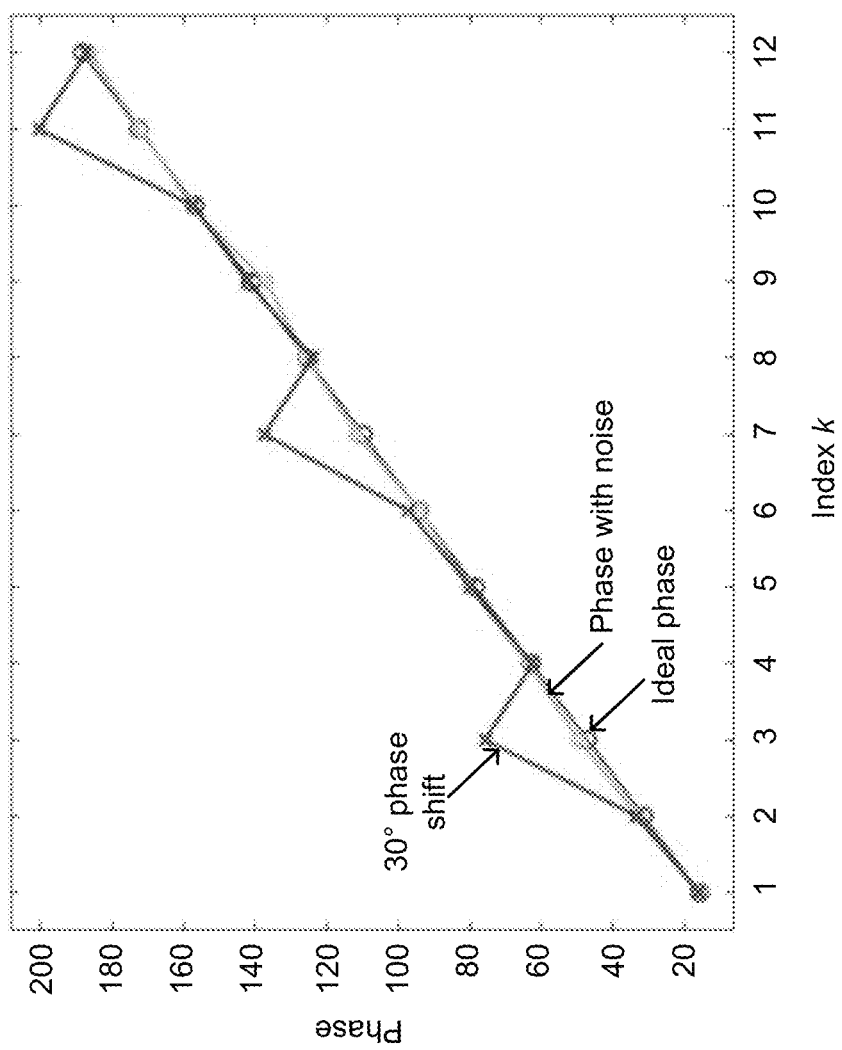
FIGS. 8A-8D are diagrams associated with a second implementation for performing phase imbalance detection in the radar sensor.
Figure 8B:
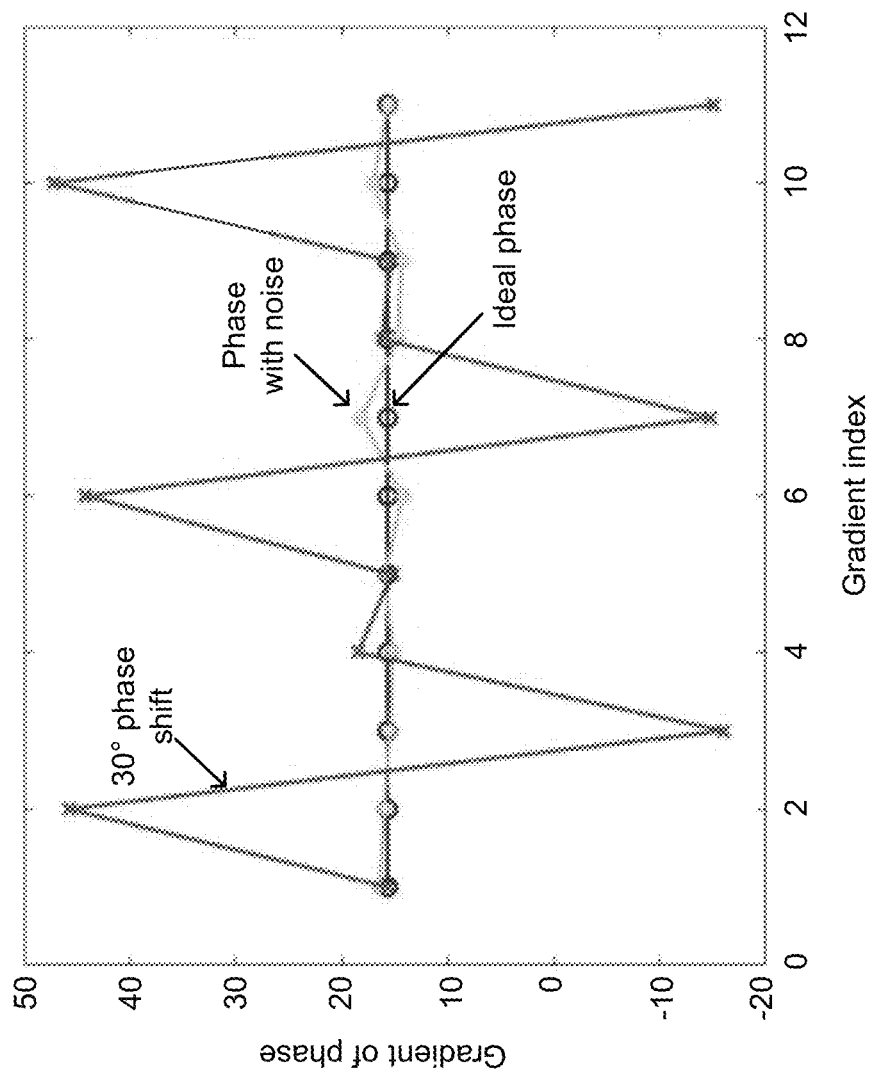

FIG. 8A illustrates an example simulation of an effect of a ball break on the phase linearity of a single target. In this example, the virtual array comprises 12 elements (e.g., when the radar sensor 100 includes three TX antennas 102 and four RX antennas 104), and a ball break on a third RX antenna 104 causes a 30° phase shift. As illustrated in FIG. 8A, the phase of the single target is non linear. Here, if the level of non-linearity in phase (e.g., which may correspond to a phase imbalance originating from a ball break) exceeds a non-linearity threshold, then the radar sensor 100 may determine that the radar sensor 100 has experienced an antenna feed issue (e.g., a ball break). In some implementations, to detect the level of non-linearity, the radar sensor 100 may determine an elementwise gradient of the phase. FIG. 8B is a diagram illustrating an example of an elementwise gradient of the phase associated with the phase illustrated in FIG. 8A. In some implementations, the radar sensor 100 may then calculate a metric (e.g., a standard deviation) based on the determined gradient values. Here, the metric may be compared to a metric threshold in order to determine whether a phase imbalance is present. In some implementations, the metric threshold may be selected to account for a level of noise (or signal-to-noise ratio (SNR)) that may be present in the phase associated with the single target.

In the example associated with FIGS. 8A and 8B, a standard deviation of the gradient values is calculated as 23.65°, and a standard deviation of the phase with only noise is 1.07°. In this scenario, a metric threshold may be selected to be a value equal to approximately five times the phase with only noise, meaning that a metric threshold of approximately 5° may be used. This means that, in a functional radar sensor 100, the phase imbalance should not exceed the threshold, and no antenna feed issue (e.g., no ball break) is detected. However, for a radar sensor 100 that has experienced an antenna feed issue (e.g., a ball break), the phase imbalance exceeds the metric threshold (e.g., since 23.65° is greater than 5°), and an antenna feed issue is detected.

Figure 8C:
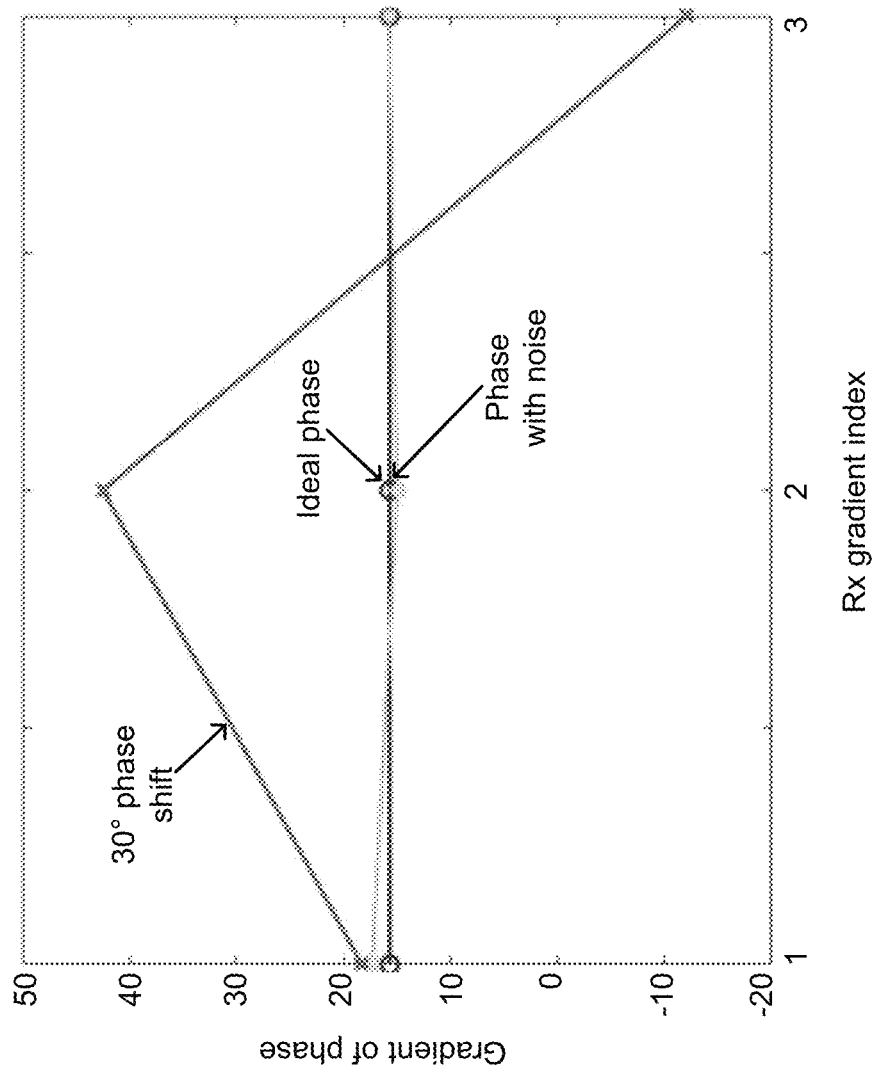
Figure 8D:
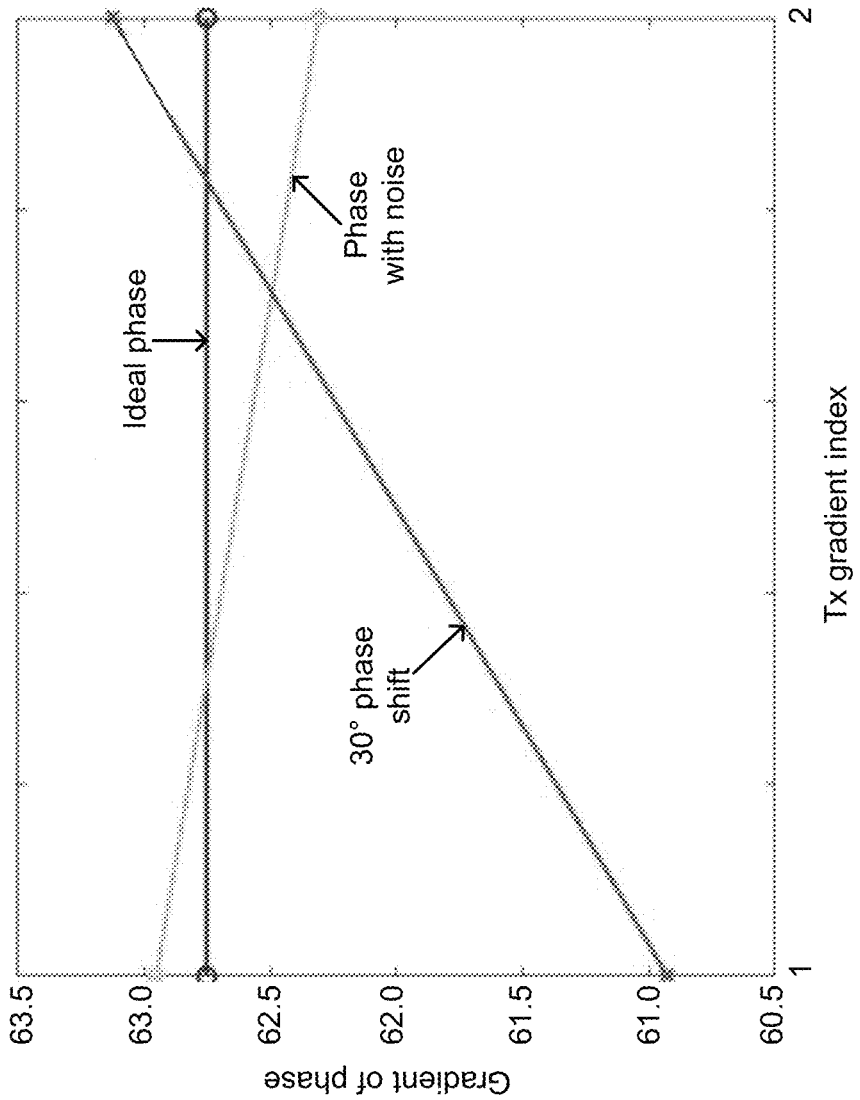

In some implementations, the radar sensor 100 may determine whether the phase imbalance is on the TX side (e.g., associated with a TX antenna 102) or on the RX side (e.g., associated with an RX antenna 104). For example, the radar sensor 100 may average over the gradient values corresponding to TX or RX channels, respectively. As one example, with respect to the simulation associated with FIGS. 8A and 8B, to determine whether an antenna feed issue is present on the RX side, the radar sensor 100 may average the gradient values corresponding to the TX channels. FIG. 8C is a diagram illustrating a result of averaging the gradient values corresponding to the TX side in association with detecting an RX side antenna feed issue. The radar sensor 100 may then determine whether the antenna feed issue on the RX side by comparing the phase imbalance to an RX side threshold. Here, if the phase imbalance on the RX side satisfies (e.g., is greater than or equal to) the RX side threshold, then the radar sensor 100 may determine that the antenna feed issue is on the RX side. Similarly, to determine whether an antenna feed issue is present on the TX side, the radar sensor 100 may average the gradient values corresponding to the RX channels. FIG. 8D is a diagram illustrating a result of averaging the gradient values corresponding to the RX side in association with detecting a TX side antenna feed issue. The radar sensor 100 may then determine whether the antenna feed issue on the TX side by comparing the phase imbalance to an TX side threshold. Here, if the phase imbalance on the TX side satisfies (e.g., is greater than or equal to) the TX side threshold, then the radar sensor 100 may determine that the antenna feed issue is on the TX side. In this example, the standard deviation of the gradient values in FIG. 8C is similar to that of the gradient values in FIG. 8B (e.g., is greater than approximately 5°). Therefore, the radar sensor 100 may determine that an antenna feed issue is present on the RX side. Conversely, the standard deviation of the gradient values in FIG. 8C is less than approximately 3°. Therefore, the radar sensor 100 may determine that an antenna feed issue is not present on the TX side.

In this way, the radar sensor 100 may determine a phase imbalance (e.g., caused by a ball break) by evaluating the level of non-linearity on the phase of a single target and, in some implementations, may determine whether the antenna feed issue is on the TX side or the RX side.

As indicated above, FIGS. 8A-8D are provided as examples. Other examples may differ from what is described with regard to FIGS. 8A-8D.

In some implementations, the phase imbalances (e.g., associated with the TX antennas 102 or the RX antennas 104) determined by the radar sensor 100 can be used for phase calibration. For example, in some implementations, the radar sensor 100 may be configured to determine a set of phase imbalances in a manner described herein, and may trigger a phase imbalance calibration based on a determination that a phase imbalance satisfies a calibration threshold. In some implementations, the radar sensor 100 may be configured to provide (e.g., to another device) a phase imbalance indication if the radar sensor 100 determines that a phase imbalance satisfies the threshold (e.g., when the radar sensor 100 determines that an antenna feed issue is present in the radar sensor 100).

In this way, the radar sensor 100 may utilize a signal processing approach for phase imbalance detection that can be implemented on, for example, the DSP 114 or the controller 116 of the radar sensor 100 (e.g., rather than requiring additional MMIC circuitry) without significantly increasing computational complexity. Further, the radar sensor 100 may be capable of (e.g., real-time) phase imbalance detection and calibration, thereby improving operation of the radar sensor 100.

Figure 9:
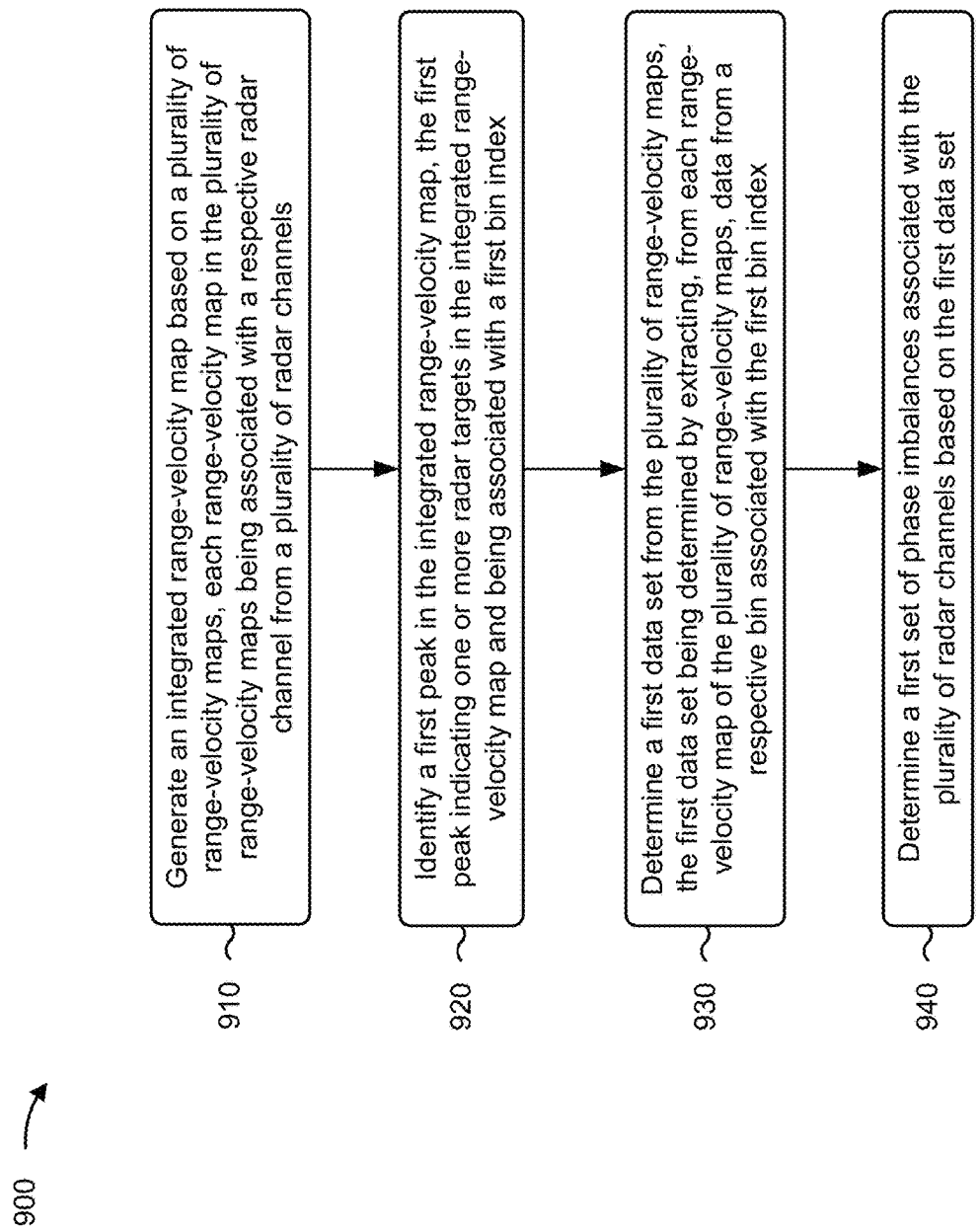
FIG. 9 is a flowchart of an example process associated with phase imbalance detection in an FMCW radar system.

FIG. 9 is a flowchart of an example process 900 associated with phase imbalance detection in an FMCW radar system. In some implementations, one or more process blocks of FIG. 9 are performed by a radar device (e.g., radar sensor 100). In some implementations, one or more process blocks of FIG. 9 are performed by components of the radar device, such as a DSP (e.g., DSP 114) or a controller (e.g., controller 116), or the like.

As shown in FIG. 9, process 900 may include generating an integrated range-velocity map based on a plurality of range-velocity maps, each range-velocity map in the plurality of range-velocity maps being associated with a respective radar channel from a plurality of radar channels (block 910). For example, the radar device may generate an integrated range-velocity map based on a plurality of range-velocity maps, each range-velocity map in the plurality of range-velocity maps being associated with a respective radar channel from a plurality of radar channels, as described above.

As further shown in FIG. 9, process 900 may include identifying a first peak in the integrated range-velocity map, the first peak indicating one or more radar targets in the integrated range-velocity map and being associated with a first bin index (block 920). For example, the radar device may identify a first peak in the integrated range-velocity map, the first peak indicating one or more radar targets in the integrated range-velocity map and being associated with a first bin index, as described above.

As further shown in FIG. 9, process 900 may include determining a first data set from the plurality of range-velocity maps, the first data set being determined by extracting, from each range-velocity map of the plurality of range-velocity maps, data from a respective bin associated with the first bin index (block 930). For example, the radar device may determine a first data set from the plurality of range-velocity maps, the first data set being determined by extracting, from each range-velocity map of the plurality of range-velocity maps, data from a respective bin associated with the first bin index, as described above.

As further shown in FIG. 9, process 900 may include determining a first set of phase imbalances associated with the plurality of radar channels based on the first data set (block 940). For example, the radar device may determine a first set of phase imbalances associated with the plurality of radar channels based on the first data set, as described above.

Process 900 may include additional implementations, such as any single implementation or any combination of implementations described below and/or in connection with one or more other processes described elsewhere herein.

In a first implementation, determining the first set of phase imbalances comprises calculating based on the first data set, a plurality of phase values associated with a target of the one or more targets, each phase value in the plurality of phase values being associated with a respective radar channel from the plurality of radar channels, subtracting a reference phase from each phase value in the plurality of phase values to remove a contribution of the target from the plurality of phase values, and determining the first set of phase imbalances based on a result of subtracting the reference phase from each phase value in the plurality of phase values.

In a second implementation, alone or in combination with the first implementation, the plurality of phase values is a first plurality of phase values, the target is a first target, the reference phase is a first reference phase, and process 900 further comprises calculating, based on the first data set, a second plurality of phase values associated with a second target of the one or more targets, each phase value in the second plurality of phase values being associated with a respective radar channel from the plurality of radar channels, subtracting a second reference phase from each phase value in the second plurality of phase values to remove a contribution of the second target from the second plurality of phase values, and determining the first set of phase imbalances further based on a result of subtracting the second reference phase from each phase value in the second plurality of phase values.

In a third implementation, in combination with the second implementation, determining the first set of phase imbalances comprises calculating a set of average phase imbalances based on the result of subtracting the first reference phase from each phase value in the first plurality of phase values and the result of subtracting the second reference phase from each phase value in the second plurality of phase values.

In a fourth implementation, alone or in combination with one or more of the first through third implementations, determining the first set of phase imbalances comprises determining that the first data set is associated with a single target, calculating, based on the first data set, a plurality of phase values associated with the single target, each phase value in the plurality of phase values corresponding to a respective radar channel of the plurality of radar channels, and determining the first set of phase imbalances based on the plurality of phase values.

In a fifth implementation, alone or in combination with one or more of the first through fourth implementations, process 900 includes identifying a second peak in the integrated range-velocity map, the second peak indicating at least one radar target in in the integrated range-velocity map and being associated with a second bin index, determining a second data set from the plurality of range-velocity maps, the second data set being determined by extracting, from each range-velocity map of the plurality of range-velocity maps, data from a respective bin associated with the second bin index, determining a second set of phase imbalances associated with the plurality of radar channels, and computing a set of average phase imbalances based on the first set of phase imbalances and the second set of phase imbalances.

In a sixth implementation, alone or in combination with one or more of the first through fifth implementations, the first set of phase imbalances is associated with a set of receive antennas.

In a seventh implementation, alone or in combination with one or more of the first through sixth implementations, the first set of phase imbalances is associated with a set of transmit antennas.

In an eighth implementation, alone or in combination with one or more of the first through seventh implementations, the integrated range-velocity map is a first integrated range-velocity map, the plurality of range-velocity maps is a first plurality of range-velocity maps associated with a first radar cube, and process 900 further comprises generating a second integrated range-velocity map by combining data from a second plurality of range-velocity maps, each range-velocity map in the second plurality of range-velocity maps being associated with a respective radar channel from the plurality of radar channels; identifying a second peak in a second integrated range-velocity map, the second peak indicating at least one radar target in in the second integrated range-velocity map and being identified by a second bin having a second range-velocity bin index; determining a second data set from the second plurality of range-velocity maps, the second data set being determined by extracting, from each range-velocity map of the second plurality of range-velocity maps, data that is included in a respective bin associated with the second range-velocity bin index; processing the second data set to determine a second set of phase imbalances associated with the plurality of radar channels; and computing a set of average phase imbalances based on the first set of phase imbalances and the second set of phase imbalances.

In a ninth implementation, alone or in combination with one or more of the first through eighth implementations, process 900 further comprises at least one of providing a phase imbalance indication based on a determination that a phase imbalance in the first set of phase imbalances satisfies a threshold; or triggering a phase imbalance calibration based on the determination that the phase imbalance satisfies the threshold.

In a tenth implementation, alone or in combination with one or more of the first through ninth implementations, process 900 further comprises determining that a component of the radar sensor has experienced an antenna feed issue based on a determination that a phase imbalance in the first set of the phase imbalances satisfies a threshold.

Although FIG. 9 shows example blocks of process 900, in some implementations, process 900 includes additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software. It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A radar device, comprising:
   a plurality of transmit channels;
   a plurality of receive channels;
      wherein the plurality of transmit channels and the plurality of receive channels form a plurality of radar channels, wherein each radar channel of the plurality of radar channels corresponds to a different transmit channel-receive channel pair;
   one or more memories; and
   one or more processors, communicatively coupled to the one or more memories, configured to:
      generate a plurality of range-velocity maps, each range-velocity map of the plurality of range-velocity maps being associated with a respective radar channel from the plurality of radar channels;
      generate an integrated range-velocity map by combining data from the plurality of range-velocity maps;
      identify a first peak in the integrated range-velocity map, the first peak indicating one or more radar targets in the integrated range-velocity map and being identified by a first bin having a first range-velocity bin index;
      determine a first data set from the plurality of range-velocity maps, the first data set being determined by extracting, from each range-velocity map of the plurality of range-velocity maps, data that is included in a respective bin associated with the first range-velocity bin index;
      process the first data set to determine a first set of phase imbalances associated with the plurality of radar channels; and
      determine that a component of the radar device has experienced an antenna feed issue based on a determination that a phase imbalance in the first set of the phase imbalances satisfies a threshold corresponding to an expected value of a connection break induced phase imbalance.

2. The radar device of claim 1, wherein the one or more processors, when processing the first data set to determine the first set of phase imbalances, are configured to:
   calculate, based on the first data set, a plurality of phase values associated with a target of the one or more targets, each phase value in the plurality of phase values being associated with a respective radar channel from the plurality of radar channels;
   subtract a reference phase from each phase value in the plurality of phase values to remove a contribution of the target from the plurality of phase values; and
   determine the first set of phase imbalances based on a result of subtracting the reference phase from each phase value in the plurality of phase values.

3. The radar device of claim 2, wherein the plurality of phase values is a first plurality of phase values, the target is a first target, the reference phase is a first reference phase, and the one or more processors are further configured to:
   calculate, based on the first data set, a second plurality of phase values associated with a second target of the one or more targets, each phase value in the second plurality of phase values being associated with a respective radar channel from the plurality of radar channels;
   subtract a second reference phase from each phase value in the second plurality of phase values to remove a contribution of the second target from the second plurality of phase values; and
   determine the first set of phase imbalances further based on a result of subtracting the second reference phase from each phase value in the second plurality of phase values.

4. The radar device of claim 3, wherein the one or more processors, when determining the first set of phase imbalances, are configured to:
   calculate a set of average phase imbalances based on the result of subtracting the first reference phase from each phase value in the first plurality of phase values and the result of subtracting the second reference phase from each phase value in the second plurality of phase values.

5. The radar device of claim 1, wherein the one or more processors, when processing the first data set to determine the first set of phase imbalances, are configured to:
   determine that the first data set is associated with a single target;
   calculate, based on the first data set, a plurality of phase values associated with the single target, each phase value in the plurality of phase values corresponding to a respective radar channel of the plurality of radar channels; and
   determine the first set of phase imbalances based on the plurality of phase values.

6. The radar device of claim 1, wherein the one or more processors are further configured to:
   identify a second peak in the integrated range-velocity map, the second peak indicating at least one radar target in the integrated range-velocity map and being identified by a second bin having a second range-velocity bin index;
   determine a second data set from the plurality of range-velocity maps, the second data set being determined by extracting, from each range-velocity map of the plurality of range-velocity maps, data that is included in a respective bin associated with the second range-velocity bin index;

process the second data set to determine a second set of phase imbalances associated with the plurality of radar channels; and compute a set of average phase imbalances based on the first set of phase imbalances and the second set of phase imbalances.

7. The radar device of claim 1, wherein the integrated range-velocity map is a first integrated range-velocity map, the plurality of range-velocity maps is a first plurality of range-velocity maps associated with a first radar cube, and the one or more processors are further configured to:

generate a second integrated range-velocity map by combining data from a second plurality of range-velocity maps, each range-velocity map in the second plurality of range-velocity maps being associated with a respective radar channel from the plurality of radar channels;

identify a second peak in a second integrated range-velocity map, the second peak indicating at least one radar target in the second integrated range-velocity map and being identified by a second bin having a second range-velocity bin index;

determine a second data set from the second plurality of range-velocity maps, the second data set being determined by extracting, from each range-velocity map of the second plurality of range-velocity maps, data that is included in a respective bin associated with the second range-velocity bin index;

process the second data set to determine a second set of phase imbalances associated with the plurality of radar channels; and compute a set of average phase imbalances based on the first set of phase imbalances and the second set of phase imbalances.

8. The radar device of claim 1, wherein the radar device further comprises a set of receive antennas, and the first set of phase imbalances is associated with the set of receive antennas.

9. The radar device of claim 1, wherein the radar device further comprises a set of transmit antennas and the first set of phase imbalances is associated with the set of transmit antennas.

10. A radar device, comprising:
a plurality of transmit channels;
a plurality of receive channels;
wherein the plurality of transmit channels and the plurality of receive channels form a plurality of radar channels, wherein each radar channel of the plurality of radar channels corresponds to a different transmit channel-receive channel pair;
one or more memories; and
one or more processors, communicatively coupled to the one or more memories, configured to:
generate a plurality of range-velocity maps, each range-velocity map of the plurality of range-velocity maps being associated with a respective radar channel from the plurality of radar channels;
generate an integrated range-velocity map by combining data from the plurality of range-velocity maps;
identify a first peak in the integrated range-velocity map, the first peak indicating one or more radar targets in the integrated range-velocity map and being identified by a first bin having a first range-velocity bin index;
determine a first data set from the plurality of range-velocity maps, the first data set being determined by extracting, from each range-velocity map of the plurality of range-velocity maps, data that is included in a respective bin associated with the first range-velocity bin index; and
process the first data set to determine a first set of phase imbalances associated with the plurality of radar channels;

wherein the one or more processors are further configured to at least one of:

provide a phase imbalance indication based on a determination that a phase imbalance in the first set of phase imbalances satisfies a threshold corresponding to an expected value of a connection break induced phase imbalance; or trigger a phase imbalance calibration based on the determination that the phase imbalance in the first set of phase imbalances satisfies the threshold corresponding to the expected value of the connection break induced phase imbalance.

11. A method, comprising:
generating, by a radar device, an integrated range-velocity map based on a plurality of range-velocity maps, each range-velocity map in the plurality of range-velocity maps being associated with a respective radar channel from a plurality of radar channels;

identifying, by the radar device, a first peak in the integrated range-velocity map, the first peak indicating one or more radar targets in the integrated range-velocity map and being associated with a first bin index;

determining, by the radar device, a first data set from the plurality of range-velocity maps, the first data set being determined by extracting, from each range-velocity map of the plurality of range-velocity maps, data from a respective bin associated with the first bin index;

determining, by the radar device, a first set of phase imbalances associated with the plurality of radar channels based on the first data set, wherein the first set of phase imbalances is associated with an antenna feed error; and determining, by the radar device, that a component of the radar device has experienced an antenna feed issue based on a determination that a phase imbalance in the first set of the phase imbalances satisfies a threshold corresponding to an expected value of a connection break induced phase imbalance.

12. The method of claim 11, wherein determining the first set of phase imbalances comprises:

calculating, based on the first data set, a plurality of phase values associated with a target of the one or more targets, each phase value in the plurality of phase values being associated with a respective radar channel from the plurality of radar channels;

subtracting a reference phase from each phase value in the plurality of phase values to remove a contribution of the target from the plurality of phase values; and determining the first set of phase imbalances based on a result of subtracting the reference phase from each phase value in the plurality of phase values.

13. The method of claim 12, wherein the plurality of phase values is a first plurality of phase values, the target is a first target, the reference phase is a first reference phase, and the method further comprises:

calculating, based on the first data set, a second plurality of phase values associated with a second target of the one or more targets, each phase value in the second plurality of phase values being associated with a respective radar channel from the plurality of radar channels;

subtracting a second reference phase from each phase value in the second plurality of phase values to remove a contribution of the second target from the second plurality of phase values; and determining the first set of phase imbalances further based on a result of subtracting the second reference phase from each phase value in the second plurality of phase values.

14. The method of claim 11, wherein determining the first set of phase imbalances comprises:

determining that the first data set is associated with a single target;

calculating, based on the first data set, a plurality of phase values associated with the single target, each phase value in the plurality of phase values corresponding to a respective radar channel of the plurality of radar channels; and determining the first set of phase imbalances based on the plurality of phase values.

15. The method of claim 11, further comprising:

identifying a second peak in the integrated range-velocity map, the second peak indicating at least one radar target in the integrated range-velocity map and being associated with a second bin index;

determining a second data set from the plurality of range-velocity maps, the second data set being determined by extracting, from each range-velocity map of the plurality of range-velocity maps, data from a respective bin associated with the second bin index;

determining a second set of phase imbalances associated with the plurality of radar channels; and computing a set of average phase imbalances based on the first set of phase imbalances and the second set of phase imbalances.

16. The method of claim 11, wherein the first set of phase imbalances is associated with a set of receive antennas.

17. The method of claim 11, wherein the first set of phase imbalances is associated with a set of transmit antennas.

18. The method of claim 11, wherein the method is a method for testing the plurality of radar channels for the antenna feed error, and wherein each radar channel of the plurality of radar channels is formed by a different transmit channel-receive channel pair of the radar device.

19. A radar system, comprising:

a set of receive antennas;

a set of transmit antennas; and one or more components configured to:

identify a first peak in an integrated range-velocity map, the first peak indicating one or more radar targets in the integrated range-velocity map and being identified by a first bin having a first bin index, wherein the integrated range-velocity map is based on a plurality of range-velocity maps, each range-velocity map in the plurality of range-velocity maps being associated with a respective radar channel from a plurality of radar channels;

determine a first data set from the plurality of range-velocity maps, the first data set being determined based on the plurality of range-velocity maps and a plurality of bins associated with the first bin index;

generate a first set of phase imbalances associated with the plurality of radar channels based on the first data set, the first set of phase imbalances indicating phase imbalances for the set of receive antennas or for the set of transmit antennas, wherein the first set of phase imbalances is associated with an antenna feed error; and determine that a component of the radar system has experienced an antenna feed issue based on a determination that a phase imbalance in the first set of the phase imbalances satisfies a threshold corresponding to an expected value of a connection break induced phase imbalance.

20. The radar system of claim 19, wherein the one or more components, when generating the first set of phase imbalances, are configured to:

calculate, based on the first data set, a plurality of phase values associated with a target of the one or more targets, each phase value in the plurality of phase values being associated with a respective radar channel from the plurality of radar channels;

subtract a reference phase from each phase value in the plurality of phase values to remove a contribution of the target from the plurality of phase values; and generate the first set of phase imbalances based on a result of subtracting the reference phase from each phase value in the plurality of phase values.

21. A radar device, comprising:

one or more memories; and one or more processors, communicatively coupled to the one or more memories, configured to:

generate an integrated range-velocity map by combining data from a plurality of range-velocity maps, each range-velocity map in the plurality of range-velocity maps being associated with a respective radar channel from a plurality of radar channels;

identify a first peak in the integrated range-velocity map, the first peak indicating one or more radar targets in the integrated range-velocity map and being identified by a first bin having a first range-velocity bin index;

determine a first data set from the plurality of range-velocity maps, the first data set being determined by extracting, from each range-velocity map of the plurality of range-velocity maps, data that is included in a respective bin associated with the first range-velocity bin index; and process the first data set to determine a first set of phase imbalances associated with the plurality of radar channels, wherein the first set of phase imbalances is associated with an antenna feed error, wherein the first set of phase imbalances is associated with a connection break at one or more antenna connections.

22. The radar device of claim 21, wherein the one or more processors are configured to evaluate the first set of phase imbalances for determining whether or not the antenna feed error is present.

23. The radar device of claim 22, wherein the one or more processors are configured to evaluate the first set of phase imbalances for determining which transmit channel or receive channel is associated with the antenna feed error.

24. The radar device of claim 21, wherein the radar device is a radar monolithic microwave integrated circuit.

25. The radar device of claim 21, wherein the plurality of radar channels include all pair combinations of the plurality of transmit channels and the plurality of receive channels.

26. The radar device of claim 21, further comprising:

a plurality of transmit channels; and a plurality of receive channels, wherein the plurality of transmit channels and the plurality of receive channels form a plurality of radar channels, wherein each radar channel of the plurality of radar channels corresponds to a different transmit channel-receive channel pair, and wherein the one or more processors are configured to generate the plurality of range-velocity maps, each range-velocity map of the plurality of range-velocity maps being associated with a respective radar channel from the plurality of radar channels.

* * * * *